(12) United States Patent
Coddens et al.

(10) Patent No.: US 12,480,957 B2
(45) Date of Patent: Nov. 25, 2025

(54) METHOD OF SCREENING FOR ANTI-DRUG ANTIBODIES AGAINST IMMUNOGLOBULIN SINGLE VARIABLE DOMAIN-BASED DRUGS

(71) Applicant: Ablynx N.V., Ghent-Zwijnaarde (BE)

(72) Inventors: Annelies Coddens, Oudenaarde (BE); Veerle Snoeck, Zingem (BE); Marie-Ange Buyse, Merelbeke (BE); Carlo Boutton, Wielsbeke (BE)

(73) Assignee: Ablynx N.V., Ghent-Zwijnaarde (BE)

( * ) Notice: Subject to any disclaimer, the term of this patent is extended or adjusted under 35 U.S.C. 154(b) by 602 days.

(21) Appl. No.: 16/495,131

(22) PCT Filed: Mar. 29, 2018

(86) PCT No.: PCT/EP2018/058232
§ 371 (c)(1),
(2) Date: Sep. 18, 2019

(87) PCT Pub. No.: WO2018/178307
PCT Pub. Date: Oct. 4, 2018

(65) Prior Publication Data
US 2021/0239709 A1 Aug. 5, 2021
US 2022/0099682 A9 Mar. 31, 2022

Related U.S. Application Data

(60) Provisional application No. 62/479,496, filed on Mar. 31, 2017.

(51) Int. Cl.
*G01N 33/68* (2006.01)
(52) U.S. Cl.
CPC ... *G01N 33/6857* (2013.01); *C07K 2317/569* (2013.01)
(58) Field of Classification Search
CPC .......... G01N 33/6857; G01N 2800/52; G01N 33/54333; C07K 2317/569
See application file for complete search history.

(56) References Cited

U.S. PATENT DOCUMENTS

2014/0205597 A1* 7/2014 Baumeister ........ G01N 33/6857 530/387.3
2017/0082637 A1 3/2017 Snoeck et al.

FOREIGN PATENT DOCUMENTS

CN 101506659 A 8/2009
CN 105074461 A 11/2015
WO WO 2006/122787 A1 11/2006
WO WO 2009/138519 A1 11/2009
WO WO 2015/173342 A1 11/2015

OTHER PUBLICATIONS

Collet-Brose et al., Journal of Immunology Research, vol. 2016, Article ID 5069678, 15 pages (Year: 2016).*
Gunn et al., Clinical and Experimental Immunology, 184: 137-146, 2016 (Year: 2016).*
Palomo et al., Antimicrobial Agents and Chemotherapy, vol. 60 No. 11, Aug. 22, 2016 (Year: 2016).*
Snoeck V (2013) Current experience in immunogenicityassessment of next generation biologics-nanobodies. European Immunogenicity Symposium, Munich, Germany. (Year: 2013).*
Immunogenicity Testing of Therapeutic Protein Products—Developing and Validating Assays for Anti-Drug Antibody Detection, Guidance for Industry. US Dept HHS. Retrieved online from <www.fda.gov> Retrieved on: Sep. 27, 2023. (Year: 2023).*
Rudikoff et al., Proc Natl Acad Sci USA vol. 79 p. 1979 (Year: 1982).*
MacCallum et al. J. Mol. Biol. 262, 732-745 (Year: 1996).*
Pascalis et al. The Journal of Immunology, 169, 3076-3084 (Year: 2002).*
Casset et al. BBRC 307, 198-205 (Year: 2003).*
Jani et al., Detection of anti-drug antibodies using a bridging ELISA compared with radioimmunoassay in adalimumab-treated rheumatoid arthritis patients with random drug levels. Rheumatology (Oxford). Nov. 2016;55(11):2050-2055. Epub Aug. 25, 2016.
Snoeck et al., An innovative approach for detecting neutralizing antibodies directed to antibody-derived therapeutics based on the conventional bridging anti-drug antibody (ADA) assay format. 11th Workshop on Recent Issues in Bioanalysis, Apr. 3, 2016. 1 page.
Zoghbi et al., A breakthrough novel method to resolve the drug and target interference problem in immunogenicity assays. J Immunol Methods. Nov. 2015;426:62-9. doi: 10.1016/j.jim.2015.08.002. Epub Aug. 6, 2015. Abstract, Introduction, and Section snippets only.

* cited by examiner

*Primary Examiner* — Kimberly Ballard
*Assistant Examiner* — Stacey N MacFarlane
(74) *Attorney, Agent, or Firm* — Wolf, Greenfield & Sacks, P.C.

(57) ABSTRACT

The present invention relates to improved immunogenicity assays and methods for performing the same. In particular, the present invention relates to improved immunogenicity assays that are capable of distinguishing neutralizing anti-drug antibodies from non-neutralizing anti-drug antibodies. More in particular, the present invention relates to improved immunogenicity assays that allow (amounts and/or concentrations of) neutralizing anti-drug antibodies to be detected and/or measured in a sample even in the presence of non-neutralizing anti-drug antibodies.

14 Claims, 10 Drawing Sheets

Specification includes a Sequence Listing.

FIGURE 4

|  | Homogeneous ECL-based bridging | Homogeneous modified ECL-based bridging | Sequential ECL-based bridging | Sequential ELISA-based bridging | Direct ELISA format |
|---|---|---|---|---|---|
| Assay set-up | Nb-construct-SULFO / Anti-Drug Antibody (ADA) / Nb-construct-BIO / Streptavidin — MSD Bridging Format | Nb-construct-ALA SULFO / Anti-Drug Antibody (ADA) / Nb-construct-BIO / Streptavidin — MSD Bridging Format | Nb-construct-SULFO / Anti-Drug Antibody (ADA) / Nb-construct-BIO / Streptavidin — MSD Bridging Format | Streptavidin-HRP / Nb-construct-BIO / Anti-Drug Antibody (ADA) / Nb-construct — ELISA Bridging Format | Goat anti-hIgG Fcγ-HRP / ADA / Nb-construct — ELISA direct Format |
| Capture Antigen | Biotinylated Nanobody construct | Biotinylated Nanobody construct | Biotinylated Nanobody construct | Nanobody construct | Nanobody construct |
| Detection reagent | Sulfo-tagged Nanobody construct | Sulfo-tagged Nanobody construct-Ala (one additional Alanine at the C-terminal end of the authentic Nanobody construct) | Sulfo-tagged Nanobody construct | Biotinylated Nanobody construct & HRP conjugated Streptavidin and TMB | HRP conjugated goat anti-hIgG Fcγ specific and Western Lightning ECL pro |
| Detection instrument | MSD Sector Imager 2400 | MSD Sector Imager 2400 | MSD Sector Imager 2400 | Microtitre plate reader | Perkin Elmer |
| Positive control | anti-Nanobody construct rabbit serum (P01 rabbit anti-sera supplied by Pfizer Inc-Wyeth Research) | anti-Nanobody construct rabbit serum (P01 rabbit anti-sera supplied by Pfizer Inc-Wyeth Research) | anti-Nanobody construct rabbit serum (P01 rabbit anti-sera supplied by Pfizer Inc-Wyeth Research) | anti-Nanobody construct rabbit serum (P01 rabbit anti-sera supplied by Pfizer Inc-Wyeth Research) | anti-Nanobody construct rabbit serum (P01 rabbit anti-sera supplied by Pfizer Inc-Wyeth Research) |
| MRD | 50 (25 + ½ in master mix) | 50 (25 + ½ in master mix) | 25 | 25 | 100 |

FIGURE 4 (CONTINUED)

| | Homogeneous ECL-based bridging | Homogeneous modified ECL-based bridging | Sequential ECL-based bridging | Sequential ELISA-based bridging | Direct ELISA format |
|---|---|---|---|---|---|
| Assay set-up | NB-construct-SULFO / Anti-Drug Antibody (ADA) / NB-construct-BIO / Streptavidin — MSD Bridging Format | NB-construct-ALA SULFO / Anti-Drug Antibody (ADA) / NB-construct-BIO / Streptavidin — MSD Bridging Format | NB-construct-SULFO / Anti-Drug Antibody (ADA) / NB-construct-BIO / Streptavidin — MSD Bridging Format | Streptavidin-HRP / NB-construct-BIO / Anti-Drug Antibody (ADA) / NB-construct — ELISA Bridging Format | Goat anti-hIgG Fcγ-HRP / ADA / NB-construct — ELISA direct Format |
| Sensitivity | 1/182,250 – 1/60,750 (=70–200 ng/mL, estimated based on 10mg/mL total Ig and 5% Nanobody construct specific) | 1/182,250 – 1/60,750 (=70–200 ng/mL, estimated based on 10mg/mL total Ig and 5% Nanobody construct specific) | 1/2,250 (=5.5 μg/mL, estimated based on 10mg/mL total Ig and 5% Nanobody construct specific) | 1/20,250 (=600 ng/mL; estimated based on 10mg/mL total Ig and 5% Nanobody construct specific) | 1/20,250 (=600 ng/mL; estimated based on 10mg/mL total Ig and 5% Nanobody construct specific). Note that estimate is based on rabbit serum and HRP-conjugated anti-rabbit-IgG detector. |
| Cut-point setting remarks | Cut-point setting is arbitrary. Commonly used statistical methods are not applicable | possible | possible | Cut-point setting is arbitrary. Commonly used statistical methods are not applicable | Cut-point setting is arbitrary. Commonly used statistical methods are not applicable |
| Detection of positive control in presence of interference | Not possible | Only samples with high interference might defy detection of low ADA levels (ng range). | Samples with high interference might defy detection of high ADA levels (μg range) | Not possible | Technically not feasible (due to different detection reagents for rabbit-positive control and interference) |
| Conclusion | impacted by interference | Allows for detection of ADA in the presence of interference | Impacted by interference | Impacted by interference | Impacted by interference |

FIGURE 7

| Target | ISV-based drug | Corresponding null variant |
|---|---|---|
| vWF | EVQLVESGGGLVQPGGSLRLSCAASGRTFSYNPM GWFRQAPGKGRELVAAISRTGGSTYYPDSVEGRF TISRDNAKRMVYLQMNSLRAEDTAVYYCAAAG VRAEDGRVRTLPSEYTFWGQGTQVTVSSAAAEV QLVESGGGLVQPGGSLRLSCAASGRTFSYNPMG WFRQAPGKGRELVAAISRTGGSTYYPDSVEGRFT ISRDNAKRMVYLQMNSLRAEDTAVYYCAAAGV RAEDGRVRTLPSEYTFWGQGTQVTVSS (SEQ ID NO:1) | EVQLVESGGGLVQPGGSLRLSCAASGRYFRENPM GWFRQAPGKGRELVAAISSTGGSTYYPDSVEGRF TISRDNAKRMVYLQMNSLRAEDTAVYYCAAAG VRATDGRVRTLPSEYTFWGQGTQVTVSSAAAEV QLVESGGGLVQPGGSLRLSCAASGRYFRENPMG WFRQAPGKGRELVAAISSTGGSTYYPDSVEGRFTI SRDNAKRMVYLQMNSLRAEDTAVYYCAAAGVR ATDGRVRTLPSEYTFWGQGTQVTVSS (SEQ ID NO:2) |
| IL6-R | EVQLVESGGGLVQPGGSLRLSCAASGSVFKINVM AWYRQAPGKGRELVAGIISGGSTYADSVKGRFT ISRDNAKNTLYLQMNSLRPEDTAVYYCAFITTES DYDLGRRYWGQGTLVTVSSGGGGSGGGGSEVQLV ESGGGLVQPGNSLRLSCAASGFTFSSFGMSWVRQ APGKGLEWVSSISGSGSDTLYADSVKGRFTISRDN AKTTLYLQMNSLRPEDTAVYYCTIGGSLSRSSQG TLVTVSS (SEQ ID NO:3) | EVQLVESGGGLVQPGGSLRLSCAASGVFGSNVM AWYRQAPGKGRELVAGIISKGSTYADSVKGRFT ISRDNAKNTLYLQMNSLRPEDTAVYYCAFITTIRD YDLGREYWGQGTLVTVSSGGGGSGGGGSEVQLVE SGGGLVQPGNSLRLSCAASGFTFSSFGMSWVRQA PGKGLEWVSSISGSGSDTLYADSVKGRFTISRDNA KTTLYLQMNSLRPEDTAVYYCTIGGSLSRSSQGT LVTVSS (SEQ ID NO:4) |

SEQUENCE LISTING

<160> NUMBER OF SEQ ID NOS: 5

<210> SEQ ID NO 1
<211> LENGTH: 259
<212> TYPE: PRT
<213> ORGANISM: Artificial Sequence
<220> FEATURE:
<223> OTHER INFORMATION: vWF: ISV-based drug

<400> SEQUENCE: 1

```
Glu Val Gln Leu Val Glu Ser Gly Gly Gly Leu Val Gln Pro Gly Gly
1               5                   10                  15

Ser Leu Arg Leu Ser Cys Ala Ala Ser Gly Arg Thr Phe Ser Tyr Asn
            20                  25                  30

Pro Met Gly Trp Phe Arg Gln Ala Pro Gly Lys Gly Arg Glu Leu Val
        35                  40                  45

Ala Ala Ile Ser Arg Thr Gly Gly Ser Thr Tyr Tyr Pro Asp Ser Val
    50                  55                  60

Glu Gly Arg Phe Thr Ile Ser Arg Asp Asn Ala Lys Arg Met Val Tyr
65                  70                  75                  80

Leu Gln Met Asn Ser Leu Arg Ala Glu Asp Thr Ala Val Tyr Tyr Cys
                85                  90                  95

Ala Ala Ala Gly Val Arg Ala Glu Asp Gly Arg Val Arg Thr Leu Pro
            100                 105                 110

Ser Glu Tyr Thr Phe Trp Gly Gln Gly Thr Gln Val Thr Val Ser Ser
        115                 120                 125

Ala Ala Ala Glu Val Gln Leu Val Glu Ser Gly Gly Gly Leu Val Gln
    130                 135                 140

Pro Gly Gly Ser Leu Arg Leu Ser Cys Ala Ala Ser Gly Arg Thr Phe
145                 150                 155                 160

Ser Tyr Asn Pro Met Gly Trp Phe Arg Gln Ala Pro Gly Lys Gly Arg
                165                 170                 175

Glu Leu Val Ala Ala Ile Ser Arg Thr Gly Gly Ser Thr Tyr Tyr Pro
            180                 185                 190

Asp Ser Val Glu Gly Arg Phe Thr Ile Ser Arg Asp Asn Ala Lys Arg
        195                 200                 205

Met Val Tyr Leu Gln Met Asn Ser Leu Arg Ala Glu Asp Thr Ala Val
    210                 215                 220

Tyr Tyr Cys Ala Ala Ala Gly Val Arg Ala Glu Asp Gly Arg Val Arg
225                 230                 235                 240

Thr Leu Pro Ser Glu Tyr Thr Phe Trp Gly Gln Gly Thr Gln Val Thr
                245                 250                 255

Val Ser Ser
```

-continued

```
<210> SEQ ID NO 2
<211> LENGTH: 259
<212> TYPE: PRT
<213> ORGANISM: Artificial Sequence
<220> FEATURE:
<223> OTHER INFORMATION: vWF: corresponding null variant

<400> SEQUENCE: 2

Glu Val Gln Leu Val Glu Ser Gly Gly Gly Leu Val Gln Pro Gly Gly
1               5                   10                  15

Ser Leu Arg Leu Ser Cys Ala Ala Ser Gly Arg Tyr Phe Arg Glu Asn
            20                  25                  30

Pro Met Gly Trp Phe Arg Gln Ala Pro Gly Lys Gly Arg Glu Leu Val
        35                  40                  45

Ala Ala Ile Ser Ser Thr Gly Gly Ser Thr Tyr Tyr Pro Asp Ser Val
    50                  55                  60

Glu Gly Arg Phe Thr Ile Ser Arg Asp Asn Ala Lys Arg Met Val Tyr
65                  70                  75                  80

Leu Gln Met Asn Ser Leu Arg Ala Glu Asp Thr Ala Val Tyr Tyr Cys
                85                  90                  95

Ala Ala Ala Gly Val Arg Ala Thr Asp Gly Arg Val Arg Thr Leu Pro
            100                 105                 110

Ser Glu Tyr Thr Phe Trp Gly Gln Gly Thr Gln Val Thr Val Ser Ser
        115                 120                 125

Ala Ala Ala Glu Val Gln Leu Val Glu Ser Gly Gly Gly Leu Val Gln
    130                 135                 140

Pro Gly Gly Ser Leu Arg Leu Ser Cys Ala Ala Ser Gly Arg Tyr Phe
145                 150                 155                 160

Arg Glu Asn Pro Met Gly Trp Phe Arg Gln Ala Pro Gly Lys Gly Arg
                165                 170                 175

Glu Leu Val Ala Ala Ile Ser Ser Thr Gly Gly Ser Thr Tyr Tyr Pro
            180                 185                 190

Asp Ser Val Glu Gly Arg Phe Thr Ile Ser Arg Asp Asn Ala Lys Arg
        195                 200                 205

Met Val Tyr Leu Gln Met Asn Ser Leu Arg Ala Glu Asp Thr Ala Val
    210                 215                 220

Tyr Tyr Cys Ala Ala Ala Gly Val Arg Ala Thr Asp Gly Arg Val Arg
225                 230                 235                 240

Thr Leu Pro Ser Glu Tyr Thr Phe Trp Gly Gln Gly Thr Gln Val Thr
                245                 250                 255

Val Ser Ser

<210> SEQ ID NO 3
<211> LENGTH: 245
<212> TYPE: PRT
<213> ORGANISM: Artificial Sequence
<220> FEATURE:
<223> OTHER INFORMATION: IL6-R: ISV-based drug

<400> SEQUENCE: 3

Glu Val Gln Leu Val Glu Ser Gly Gly Gly Leu Val Gln Pro Gly Gly
1               5                   10                  15

Ser Leu Arg Leu Ser Cys Ala Ala Ser Gly Ser Val Phe Lys Ile Asn
            20                  25                  30

Val Met Ala Trp Tyr Arg Gln Ala Pro Gly Lys Gly Arg Glu Leu Val
        35                  40                  45

Ala Gly Ile Ile Ser Gly Gly Ser Thr Ser Tyr Ala Asp Ser Val Lys
```

Gly Arg Phe Thr Ile Ser Arg Asp Asn Ala Lys Asn Thr Leu Tyr Leu
65                  70                  75                  80

Gln Met Asn Ser Leu Arg Pro Glu Asp Thr Ala Val Tyr Tyr Cys Ala
                85                  90                  95

Phe Ile Thr Thr Glu Ser Asp Tyr Asp Leu Gly Arg Arg Tyr Trp Gly
            100                 105                 110

Gln Gly Thr Leu Val Thr Val Ser Gly Gly Gly Ser Gly Gly
            115                 120                 125

Gly Ser Glu Val Gln Leu Val Glu Ser Gly Gly Leu Val Gln Pro
        130                 135                 140

Gly Asn Ser Leu Arg Leu Ser Cys Ala Ala Ser Gly Phe Thr Phe Ser
145                 150                 155                 160

Ser Phe Gly Met Ser Trp Val Arg Gln Ala Pro Gly Lys Gly Leu Glu
                165                 170                 175

Trp Val Ser Ser Ile Ser Gly Ser Gly Ser Asp Thr Leu Tyr Ala Asp
                180                 185                 190

Ser Val Lys Gly Arg Phe Thr Ile Ser Arg Asp Asn Ala Lys Thr Thr
                195                 200                 205

Leu Tyr Leu Gln Met Asn Ser Leu Arg Pro Glu Asp Thr Ala Val Tyr
210                 215                 220

Tyr Cys Thr Ile Gly Gly Ser Leu Ser Arg Ser Ser Gln Gly Thr Leu
225                 230                 235                 240

Val Thr Val Ser Ser
                245

<210> SEQ ID NO 4
<211> LENGTH: 245
<212> TYPE: PRT
<213> ORGANISM: Artificial Sequence
<220> FEATURE:
<223> OTHER INFORMATION: IL6-R: corresponding null variant

<400> SEQUENCE: 4

Glu Val Gln Leu Val Glu Ser Gly Gly Gly Leu Val Gln Pro Gly Gly
1               5                   10                  15

Ser Leu Arg Leu Ser Cys Ala Ala Ser Gly Ser Val Phe Gly Ser Asn
            20                  25                  30

Val Met Ala Trp Tyr Arg Gln Ala Pro Gly Lys Gly Arg Glu Leu Val
        35                  40                  45

Ala Gly Ile Ile Ser Lys Gly Ser Thr Ser Tyr Ala Asp Ser Val Lys
    50                  55                  60

Gly Arg Phe Thr Ile Ser Arg Asp Asn Ala Lys Asn Thr Leu Tyr Leu
65                  70                  75                  80

Gln Met Asn Ser Leu Arg Pro Glu Asp Thr Ala Val Tyr Tyr Cys Ala
                85                  90                  95

Phe Ile Thr Thr Ile Arg Asp Tyr Asp Leu Gly Arg Glu Tyr Trp Gly
            100                 105                 110

Gln Gly Thr Leu Val Thr Val Ser Ser Gly Gly Gly Ser Gly Gly
            115                 120                 125

Gly Ser Glu Val Gln Leu Val Glu Ser Gly Gly Leu Val Gln Pro
        130                 135                 140

Gly Asn Ser Leu Arg Leu Ser Cys Ala Ala Ser Gly Phe Thr Phe Ser
145                 150                 155                 160

Ser Phe Gly Met Ser Trp Val Arg Gln Ala Pro Gly Lys Gly Leu Glu

```
                         165                 170                 175
Trp Val Ser Ser Ile Ser Gly Ser Gly Ser Asp Thr Leu Tyr Ala Asp
            180                 185                 190

Ser Val Lys Gly Arg Phe Thr Ile Ser Arg Asp Asn Ala Lys Thr Thr
        195                 200                 205

Leu Tyr Leu Gln Met Asn Ser Leu Arg Pro Glu Asp Thr Ala Val Tyr
    210                 215                 220

Tyr Cys Thr Ile Gly Gly Ser Leu Ser Arg Ser Ser Gln Gly Thr Leu
225                 230                 235                 240

Val Thr Val Ser Ser
                245

<210> SEQ ID NO 5
<211> LENGTH: 5
<212> TYPE: PRT
<213> ORGANISM: Artificial Sequence
<220> FEATURE:
<223> OTHER INFORMATION: C-terminal sequence

<400> SEQUENCE: 5

Val Thr Val Ser Ser
1               5
```

METHOD OF SCREENING FOR ANTI-DRUG ANTIBODIES AGAINST IMMUNOGLOBULIN SINGLE VARIABLE DOMAIN-BASED DRUGS

RELATED APPLICATIONS

This application is a national stage filing under 35 U.S.C. § 371 of International Patent Application PCT/EP2018/058232, filed Mar. 29, 2018, which claims priority under 35 U.S.C. § 119(e) to U.S. Provisional Application Ser. No. 62/479,496, filed Mar. 31, 2017, the entire contents of each of which are incorporated herein in their entirety.

The present invention relates to improved immunogenicity assays and methods for performing the same.

In particular, the present invention relates to improved immunogenicity assays that are capable of distinguishing neutralizing anti-drug antibodies from non-neutralizing anti-drug antibodies.

More in particular, the present invention relates to improved immunogenicity assays that allow (amounts and/or concentrations of) neutralizing anti-drug antibodies to be detected and/or measured in a sample even in the presence of non-neutralizing anti-drug antibodies.

The assays and methods described herein can in particular be used for immunogenicity assays that are to be applied to measuring ADA's against (biological) drugs that are based on and/or comprise one or more immunoglobulin single variable domains or "ISVDs", such as one to more Nanobodies™.

Other aspects, embodiments, uses and advantages of the invention will become clear from the further description herein.

Immunogenicity testing of therapeutic antibodies, including assessment of binding anti-drug antibodies (ADA) and evaluation of their neutralizing potential, is a regulatory requirement. Of particular interest in immunogenicity testing are so-called "neutralizing antibodies" or "NAb's", which can generally be described as ADA's that are able to affect the function of the therapeutic antibody by blocking its ability to bind to its intended target, usually because the Nab can bind to one or more of the complementary determining regions (CDRs) of the antibody drug.

Neutralizing antibody assay development based on drug-target interaction is challenging and often requires extensive pre-treatment steps in order to obtain the required drug and target tolerance for proper detection of NAb during clinical trials. Such a pre-treatment step not only reduces the assay sensitivity of the NAb assay, but also often introduces a sensitivity difference between the ADA assay and the NAb assay. Such a sensitivity gap complicates ADA data interpretation as a discrepancy between ADA and NAb results can either reflect presence of non-neutralizing antibodies only or also reflect neutralizing antibodies that are left undetected in the NAb assay.

The present invention aims to provide an improved NAb assay format for the detection and/or measurement of NAb allowing unambiguous comparison of the levels of binding ADA and NAb. With advantage, the improved ADA assay of the invention is based on conventional bridging assay formats, but with an adaptation that allows for NAb's to be detected and/or measured even in the presence of non-neutralizing ADA's.

As further described herein, the improved NAb assays of the invention are capable of distinguishing NAb's against the (one or more) ISVs that are present in the ISV-based drug from non-neutralizing ADA's against said ISV's. In particular, the improved NAb assays of the invention can in particular be used for detecting and/or measuring NAb's against the (one or more) ISVs that are present in the ISV-based drug, even in the presence of non-neutralizing ADA's against said ISV's.

Generally, the adaptation according to the invention is that the ADA bridging assay is performed in presence of (a sufficient amount of, and in particular an excess of) what will be referred to herein as a "null variant" of the ISV-based drug. Such null-variants are as further described herein, but generally are variants of the ISV-based drug that are essentially identical to the ISV-based drug except for the fact that they are not functional with respect to binding to the target of the ISV-based drug. In particular, the null variants used herein are such that they are essentially identical to the ISV-based drug, except that they are not capable of binding (an in particular, not capable of binding specifically, as defined herein) to the target of the ISV-based drug. Generally, for this purpose, (the ISV's that are present in) the null variants will have essentially the same framework sequences as (the ISV's that are present in) the ISV-based drug, but will have different/altered CDRs, such that they are non-functional with respect to binding to the target(s) of the ISV-based drug, and in particular such that the null variants are no longer capable of binding (and in particular, binding specifically) to the target(s) of the ISV-based drug.

Thus, in a first aspect, the invention relates to a method for detecting and/or measuring, in a sample, anti-drug antibodies (ADA) against an ISV-based drug, in which said ISV-based drug comprises one or more immunoglobulin single variable domains (ISVDs), in which each such ISVD is comprised of framework regions (FRs) and complementarity determining regions (CDRs) and in which at least one of the ISVDs present in the ISV-based drug is specific for a therapeutically relevant target, said method comprising performing a bridging anti-drug antibody assay in the presence of a variant of said ISV-based drug, which variant is such that it is non-functional with respect to binding to the therapeutic target(s) to which the ISV-based drug is intended to bind (but otherwise is essentially identical to the ISV-based drug).

In particular, the invention relates to such a method in which the bridging anti-drug antibody assay is performed in the presence of a variant of said ISV-based drug, which variant is such that it is not capable of specifically binding to the therapeutic target(s) to which the ISV-based drug is intended to bind (but otherwise is essentially identical to the ISV-based drug).

More in particular, the invention relates to such a method in which the bridging anti-drug antibody assay is performed in the presence of a variant of said ISV-based drug, wherein said variant is essentially identical to the ISV-based drug, except that the one or more ISVs in the variant that correspond to the one or more ISVs that, in the ISV-based drug, are intended to bind to the (one or more) therapeutic targets of the ISV-based drug have CDR's that are different from the CDR's in the corresponding ISVs in the ISV-based drug, such that said variant is non-functional with respect to binding to the therapeutic target(s) to which the ISV-based drug is intended to bind (but otherwise is essentially identical to the ISV-based drug).

Even more in particular, the invention relates to such a method in which the bridging anti-drug antibody assay is performed in the presence of a variant of said ISV-based drug, wherein said variant is essentially identical to the ISV-based drug, except that the one or more ISVs in the variant that correspond to the one or more ISVs that, in the ISV-based drug, are intended to bind to the (one or more) therapeutic targets of the ISV-based drug have CDR's that are different from the CDR's in the corresponding ISVs in the ISV-based drug, such that said variant is not capable of specifically binding (as defined herein) to the therapeutic target(s) to which the ISV-based drug is intended to bind (but otherwise is essentially identical to the ISV-based drug).

When a (null) variant is said herein to be "essentially identical" to an ISV-based drug, this generally means that said variant has essentially the same amino acid sequence as the ISV-based drug, except for the changes to the CDRs that, in the variant, remove the ability of the ISV(s) present in the variant to bind to the therapeutic target(s) of the ISV-based drug. Generally, this means that, except for the changes in the CDRs (which should be disregarded for the purposes of this calculation), the variant will have a degree of sequence identity (as defined herein) with the ISV-based drug of at least 90%, such as at least 95%, in particular at least 99% (up to and including 100%).

In particular, in the variants, at the level of the ISVs, each of the ISVs will have framework regions that have at least 90%, such as at least 95%, in particular at least 99% (up to and including 100%) sequence identity with the framework regions of the corresponding ISVD(s) in the ISV-based drug (but again, the CDR's that, in the ISV-based drug, allow the ISV-based drug to bind to the intended therapeutic target(s) will have been changed in the variants such that the variant is no longer capable of binding to said therapeutic target(s)). For the remainder (like any linkers etc. that may be present in the ISV-based drug), the variant is essentially identical to the ISV-based drug.

In the context of the disclosure herein, it should be noted that the ISV-based drug may, in addition to the one or more ISVs that bind to the therapeutic target(s), may also contain one or more "other" ISV's, for example an ISV that provides for an increased half-life (as defined herein), for example through binding to a serum protein such as serum albumin. Generally, ADAs that bind to such "other" ISVs will not interfere with binding of the ISV-based drug to the intended therapeutic target(s) of the ISV-based drug and therefore will not be NAb's for the ISV-based drug. For this reason, when such "other" ISVs are present in the ISV-based drug, the corresponding ISVs in the null variant may be essentially identical to the ISVs in the ISV-based drug (including having the same CDRs). However, if such ADAs affect other desired properties of the ISV-based drug (for example and without limitation, its pharmacological properties like its half-life because they interfere with binding of the ISV-based drug to serum albumin) it is also within the scope of the invention that, in the null variants, the CDR's of these other ISVs will also have been altered compared to the CDRs of the corresponding ISVs in the ISV-based drug (essentially as described herein for the "target-binding" CDRs).

As indicated, the assay/method of the invention should be performed in the presence of (a sufficient amount of, and preferably an excess of) a null variant of the ISV based drug, such that most and preferably all of the non-neutralizing ADAs (in particular, ADAs that bind to the framework sequences of the ISV(s) that are present in the ISV-based drug) bind to the null variant in the assay reaction mix rather than to the ISV-based drugs. For example, generally in the practice of the invention, the null variant may be added in an amount and/or concentration that is more than 2×, such as more than 5×, for example more that 10×, and up to 50× or more, the amount and/or concentration, respectively, of the ISV-based drug present in the reaction mix (i.e. based on the amount or concentration of the labeled ISV-based drug in the reaction mixture).

As will be clear to the skilled person based on the disclosure herein, the assay method described herein is most preferably performed such that essentially only neutralizing ADAs against the ISV-based drug are detected or measured (even when the sample also contains non-neutralizing ADAs against the ISV-based drug).

Also, as will again be clear to the skilled person, the assay methods of the invention may in particular be performed on a sample that contains (or is suspected to contain), both neutralizing and non-neutralizing ADAs against the ISV-based drug, which sample has preferably been obtained from a human subject, and may for example be a sample of whole blood, serum, plasma, lymph fluid, ocular fluid, bronchio-alveolar fluid/BALF, cerebrospinal fluid or another biological fluid (such as sputum or nasal washes); and in particular a sample of whole blood, serum or plasma.

The NAb assay format of the invention has been found to be highly drug- and target-tolerant and has been found to allow for the detection of neutralizing antibodies at the same sensitivity of the ADA assay, allowing unambiguous immunogenicity data interpretation. Titer determination using this assay and correlation with PK, PD, efficacy and safety readouts allows the determination of clinically relevant titer levels.

Signals generated in the assay of the invention reflect antibodies with neutralizing potential as non-neutralizing antibodies are complexed with the null variant, in a way comparable to the conventional drug displacement set-up (confirmatory assay). In a case study, a broad panel of positive control monoclonal and polyclonal antibodies and pre-clinical study samples was evaluated in the ADA assay, the NAb assay of the invention and the conventional competitive ligand binding NAb assay (CLBA) and assay results were compared. The ADA assay was fully validated according to FDA guidelines and demonstrated sensitivity and drug tolerance characteristics of <100 ng/ml at 60 µg/ml drug.

The NAb assay of the invention was qualified and demonstrated highly comparable sensitivity and drug tolerance characteristics, whereas in the validated CLBA NAb assay, an extensive pretreatment step was required to achieve drug and target tolerance, resulting in lower drug tolerance characteristics with a difference up to 50-fold. The case study showed that detection of NAbs occurs at a similar sensitivity as for the ADA assay when using the proposed NAb assay format, enabling determination of the neutralizing fraction within the ADA sample.

Throughout the present specification, the abbreviations "ISV" and "ISVD" are interchangeably used to indicate immunoglobulin single variable domains (as further defined herein). Furthermore, throughout the specification, when a method, aspect, feature or element of the invention is said to be "as further described herein", this should generally be understood as meaning that any preference(s) that are generally described herein for (the methods of) the invention are also preferences for such a method, aspect, feature or element, unless the specific context requires otherwise.

In the aspects of the invention that are described herein, the at least one immunoglobulin variable domain that is present in the protein, polypeptide or other compound or molecule may in particular be a VH-domain, VHH-domain or other domain that has been derived from a VH- or VHH-domain. In one specific aspect, said at least one immunoglobulin variable domain is an immunoglobulin single variable domain (i.e. an immunoglobulin single variable domain that is capable for forming a (fully) functional antigen binding site without the VH/VL interaction that is required for the variable domains of conventional four-chain antibodies) and in particular an ISV that is or has been derived from a VHH domain or a VH domain. Reference is for example made to WO 09/138519 (or in the prior art cited in WO 09/138519) and WO 08/020079 (or in the prior art cited in WO 08/020079). More in particular, such an ISV may be a VHH domain, a nanobody, a (single) domain antibody or a dAb (and in particular, a (single) domain antibody or dAb that is derived from a VH-domain, such as a human VH-domain).

Examples of proteins, polypeptides or other compounds or molecules that comprise at least one such ISV will be clear to the skilled person, again for example from WO 09/138519 (or in the prior art cited in WO 09/138519) or WO 08/020079 (or in the prior art cited in WO 08/020079).

Overall, as is well known for immunoglobulin variable domains generally, the ISVD's invention will comprise 4 framework regions (FW1, FW2, FW3 and FW4) and 3 CDR's (CDR1, CDR2 and CDR3). As with immunoglobulin variable domains generally, the sequence of the CDR's will depend on the antigen/target(s) to which the ISVD has been raised and/or are intended to bind. The framework regions can generally be any suitable framework regions for ISVDs (optionally in association with one or more of the CDR's). For example, if the ISV is a Nanobody, the framework regions will generally contain a suitable number of VHH hallmark residues (e.g. at positions 11, 37, 44, 45, 47, 83, 84, 103, 104 and/or 108; see for example Tables A-3 and A-5 to A-8 of WO 08/020079); one or more other amino acid residues that can be present in VHH's/Nanobodies (such as one or more humanizing substitutions that are known per se for VHH's and Nanobodies; reference is for example made to the teaching in WO 08/020079) and/or one or more other suitable amino acid residues or substitutions for VHH's/Nanobodies; or any suitable combination of such amino acid residues/substitutions.

In addition, said ISVD or Nanobody (or a protein/polypeptide/compound comprising the same) can further contain one or more suitable amino acid residues, substitutions, deletions and/or additions that are known per se for such an ISVD or Nanobody, including without limitations one or more amino acid residues, substitutions, deletions and/or additions that reduce (or are intended to reduce) the binding of pre-existing antibodies to the ISVD/Nanobodies. These include the amino acid residues, substitutions, additions or deletions mentioned in the prior art cited herein, such as a C-terminal extension as described in WO 12/175741 and/or one or more of the amino acid substitutions in or close to the C-terminal region as described in WO 12/175741, Harmsen et al. and Nieba et al. (such as for example at or close to positions 11, 14, 41, 83, 84, 89, 108 and/or the C-terminal VTVSS sequence) and/or in WO 11/07586 or WO 13/024059.

In one aspect, as further set out herein, the ISV-based drug has a half-life (as defined herein) of at least 1 day, preferably at least 3 days, more preferably at least 7 days, such as at least 10 days, in a human subject. As also further set out herein, the ISV-based drug may for example comprise one or more binding domains, binding units or other functional groups or moieties that confer such a(n) (increased) half-life to the ISV-based drug.

As set out further herein, one specific but non-limiting example of such a binding domain that can be present in the ISV-based drug in order to confer such a(n) (increased) half-life to the ISV-based drug is an ISVD that is directed against a serum protein such as serum albumin (in particular, against human serum albumin). Thus, in one specific aspect of the invention, the ISV-based drug contains at least one such ISVD directed against a (human) serum protein (such as against human serum albumin). Some non-limiting examples of such ISVD's against human serum albumin can be found in WO 06/122787 and WO 12/175400, and for example include the serum-albumin binding Nanobody called "Alb-1" in WO 06/122787 and its humanized variants (such as the serum-albumin binding Nanobody called "Alb-8" in WO 06/122787 and the serum-albumin binding Nanobody called "Alb-23" in WO 12/175400).

Also, in a preferred but non-limiting aspect, the ISV-based drugs referred to herein are preferably suitable and/or intended for administration to a human subject (in particular, as a therapeutic, prophylactic, diagnostic or drug); or are suitable and/or intended for use in an animal model (such as a disease model).

In the present specification, whenever the term "ISV" is used, it should be understood that:

such an ISV is preferably a Nanobody, in which the term "Nanobody" is generally as defined in or WO 08/020079 or WO 09/138519, and thus in a specific aspect generally denotes a VHH, a humanized VHH or a camelized VH (such as a camelized human VH) or generally a sequence optimized VHH (such as e.g. optimized for chemical stability and/or solubility, maximum overlap with known human framework regions and maximum expression). It is noted that the terms Nanobody or Nanobodies are registered trademarks of Ablynx N.V. and thus may also be referred to as Nanobody® and/or Nanobodies®); the term "ISV" or "ISV-based drug" in its broadest sense also includes "ISV-based biologicals" and, when the ISV is a Nanobody, "Nanobody-based biologicals". An "ISV-based biological" is defined herein as a protein, polypeptide or other biological drug that comprises or essentially consists of at least one (such as one, two or three) ISV's. Similarly, a "Nanobody-based biological" is defined as a protein, polypeptide or other biological drug that comprises or essentially consist of at least one (such as one, two or three) Nanobodies. As with the term "ISV", whenever the term "ISV-based biological" is used, it should be understood that such an ISV-based biological is preferably a Nanobody-based biological. Within the context of the present invention, both an "ISV-based biological" and a "Nanobody-based biological" may for example be a monovalent, bivalent (or multivalent), bispecific (or multispecific), and biparatopic (or "multiparatopic) ISV construct or Nanobody construct, respectively. Also, any ISV-based or Nanobody-based biological may for example, in addition to the one or more (such as one, two or three) ISV's or Nanobodies, optionally further comprise one or more (such as one or two) other further therapeutic moieties and/or one or more (such as one or two) other moieties that influence the pharmacokinetic or pharmacodynamic properties of the ISV-based or Nanobody-based biological (such as its half-life). Suitable examples of such further therapeutic or other moieties will be clear to the skilled person, and for example generally can include any therapeutically active protein, polypeptide or other binding domain or binding unit, as well as for example modifications such as those described on pages 149 to 152 of WO 09/138159. An ISV-based biological or Nanobody-based biological is preferably a therapeutic or intended for use as a therapeutic (which includes prophylaxis and diagnosis) and for this purpose preferably contains at least one ISV against a therapeutically relevant target (such as for example RANK-L, vWF, IgE, RSV, CXCR4, IL-23 or other interleukins, etc.). For some specific but non-limiting examples of such ISV-based or Nanobody-based biologicals, reference is for example made to the various applications by Ablynx N.V. (such as for example and without limitation WO 2004/062551, WO 2006/122825, WO 2008/020079 and WO 2009/068627), as well as for example (and without limitation) to applications such as WO 06/038027, WO 06/059108, WO 07/063308, WO 07/063311, WO 07/066016 and WO 07/085814. These references also give examples of different nanobody formats (such as bispecific and biparatopic constructs) and suitable linkers that can be used to make such constructs. Also, as further described herein, an ISVD or Nanobody as described herein may be directed against a (human) serum protein such as (human) serum albumin, and such an ISVD or Nanobody may also find therapeutic uses, in particular in and/or for extending the half-life of therapeutic moieties and compounds (such as in or for the ISV-based biologicals described herein). Reference is for example made to WO 2004/041865, WO 2006/122787 and WO 2012/175400, which generally describe the use of serum-albumin binding nanobodies for half-life extension. Also, in the present specification, unless explicitly mentioned otherwise herein, all terms mentioned herein have the meaning given in WO 09/138519 (or in the prior art cited in WO 09/138519) or WO 08/020079 (or in the prior art cited in WO 08/020079). Also, where a method or technique is not specifically described herein, it can be performed as described in WO 09/138519 (or in the prior art cited in WO 09/138519) or WO 08/020079 (or in the prior art cited in WO 08/020079).

Also, the following terms have the same meaning as given on, and/or where applicable can be determined in the manner described in, pages 62-75 of WO 09/138519: "agonist", "antagonist", "inverse agonist", "non-polar, uncharged amino acid residue", "polar uncharged amino acid residue", "polar, charged amino acid residue", "sequence identity", "exactly the same" and "amino acid difference" (when referring to a sequence comparison of two amino acid sequences), "(in) essentially isolated (form)", "domain", "binding domain", "antigenic determinant", "epitope", "against" or "directed against" (an antigen), "specificity" and "half-life". In addition, the terms "modulating" and "to modulate", "interaction site", "specific for", "cross-block", "cross-blocked" and "cross-blocking" and "essentially independent of the pH" are as defined on (and/or can be determined as described on) pages 74-79 of WO 10/130832 of applicant. Also, when referring to a construct, compound, protein or polypeptide of the invention, terms like "monovalent", "bivalent" (or "multivalent"), "bispecific" (or "multispecific"), and "biparatopic" (or "multiparatopic") may have the meaning given in WO 09/138.519, WO 10/130832 or WO 08/020079.

The term "half-life" as used herein relation to a protein, polypeptide or other compound or molecule (and in particular, an ISV, Nanobody, ISV-based biological, Nanobody-based biological or any other amino acid sequence, compound or polypeptide can generally be defined as described in paragraph o) on page 57 of WO 08/020079 and as mentioned therein refers to the time taken for the serum concentration of the amino acid sequence, compound or polypeptide to be reduced by 50%, in vivo, for example due to degradation of the sequence or compound and/or clearance or sequestration of the sequence or compound by natural mechanisms. The in vivo half-life of an amino acid sequence, compound or polypeptide of the invention can be determined in any manner known per se, such as by pharmacokinetic analysis. Suitable techniques will be clear to the person skilled in the art, and may for example generally be as described in paragraph o) on page 57 of WO 08/020079. As also mentioned in paragraph o) on page 57 of WO 08/020079, the half-life can be expressed using parameters such as the t½-alpha, t½-beta and the area under the curve (AUC). In this respect it should be noted that the term "half-life" as used herein in particular refers to the t½-beta or terminal half-life (in which the t½-alpha and/or the AUC or both may be kept out of considerations). Reference is for example made to the Experimental Part below, as well as to the standard handbooks, such as Kenneth, A et al: Chemical Stability of Pharmaceuticals: A Handbook for Pharmacists and Peters et al, Pharmacokinete analysis: A Practical Approach (1996). Reference is also made to "Pharmacokinetics", M Gibaldi & D Perron, published by Marcel Dekker, 2nd Rev. edition (1982). Similarly, the terms "increase in half-life" or "increased half-life" as also as defined in paragraph o) on page 57 of WO 08/020079 and in particular refer to an increase in the t½-beta, either with or without an increase in the t½-alpha and/or the AUC or both.

When a term is not specifically defined herein, it has its usual meaning in the art, which will be clear to the skilled person. Reference is for example made to the standard handbooks, such as Sambrook et al, "Molecular Cloning: A Laboratory Manual" (2nd. Ed.), Vols. 1-3, Cold Spring Harbor Laboratory Press (1989); F. Ausubel et al, eds., "Current protocols in molecular biology", Green Publishing and Wiley Interscience, New York (1987); Lewin, "Genes II", John Wiley & Sons, New York, N.Y., (1985); Old et al., "Principles of Gene Manipulation: An Introduction to Genetic Engineering", 2nd edition, University of California Press, Berkeley, CA (1981); Roitt et al., "Immunology" (6th. Ed.), Mosby/Elsevier, Edinburgh (2001); Roitt et al., Roitt's Essential Immunology, 10th Ed. Blackwell Publishing, UK (2001); and Janeway et al., "Immunobiology" (6th Ed.), Garland Science Publishing/Churchill Livingstone, New York (2005), as well as to the general background art cited herein.

Also, herein, the amino acid residues of a Nanobody are numbered according to the general numbering for VH domains given by Kabat et al. ("Sequence of proteins of immunological interest", US Public Health Services, NIH Bethesda, MD, Publication No. 91), as applied to VHH domains from Camelids in the article of Riechmann and Muyldermans, J. Immunol. Methods 2000 Jun. 23; 240 (1-2): 185-195; or referred to herein. According to this numbering, FR1 of a Nanobody comprises the amino acid residues at positions 1-30, CDR1 of a Nanobody comprises the amino acid residues at positions 31-35, FR2 of a Nanobody comprises the amino acids at positions 36-49, CDR2 of a Nanobody comprises the amino acid residues at positions 50-65, FR3 of a Nanobody comprises the amino acid residues at positions 66-94, CDR3 of a Nanobody comprises the amino acid residues at positions 95-102, and FR4 of a Nanobody comprises the amino acid residues at positions 103-113. [In this respect, it should be noted that—as is well known in the art for VH domains and for VHH domains—the total number of amino acid residues in each of the CDR's may vary and may not correspond to the total number of amino acid residues indicated by the Kabat numbering (that is, one or more positions according to the Kabat numbering may not be occupied in the actual sequence, or the actual sequence may contain more amino acid residues than the number allowed for by the Kabat numbering). This means that, generally, the numbering according to Kabat may or may not correspond to the actual numbering of the amino acid residues in the actual sequence. Generally, however, it can be said that, according to the numbering of Kabat and irrespective of the number of amino acid residues in the CDR's, position 1 according to the Kabat numbering corresponds to the start of FR1 and vice versa, position 36 according to the Kabat numbering corresponds to the start of FR2 and vice versa, position 66 according to the Kabat numbering corresponds to the start of FR3 and vice versa, and position 103 according to the Kabat numbering corresponds to the start of FR4 and vice versa.].

Alternative methods for numbering the amino acid residues of VH domains, which methods can also be applied in an analogous manner to VHH domains from Camelids and to Nanobodies, are the method described by Chothia et al. (Nature 342, 877-883 (1989)), the so-called "AbM definition" and the so-called "contact definition". However, in the present description, aspects and figures, the numbering according to Kabat as applied to VHH domains by Riechmann and Muyldermans will be followed, unless indicated otherwise.

It should also be noted that the Figures, any Sequence Listing and the Experimental Part/Examples are only given to further illustrate the invention and should not be interpreted or construed as limiting the scope of the invention and/or of the appended claims in any way, unless explicitly indicated otherwise herein.

As mentioned herein, the ADA assays of the invention can be performed using known bridging assay formats known per se from the prior art (i.e. by performing said assays in the presence of a null-variant as defined herein).

Generally, such ADA assays for determining anti-drug antibodies against a given biological drug or compound are standard knowledge in the field of pharmacology and they are routinely used during the clinical development of biological drug products (as well as being required by various regulatory agencies around the world). In addition, it is envisaged that ADA assays can be used to monitor occurrence of treatment emergent antibodies in patients treated with a given drug and based on the results treatment can be amended or changed, therefore, such ADA assays may be important diagnostic means to guide physicians in designing optimal treatment for patients. Reference is for example made to the reviews by Wadhwa and Thorpe, Bioanalysis (2010), 2(6), 1073-1084 and by Shankar et al., Journal of Pharmaceutical and Biomedical Analysis, 48 (2008), 1267-1281; as well as Wadhwa and Thorpe, Journal of Immunotoxicology, 3:115-121, 2006; Mire-Sluis et al., J. Immunol. Meth. 289 (2004), 1-16; Peng et al., Journal of Pharmaceutical and Biomedical Analysis, 54, (2011), 629-635; and Loyet et al., J. Immunol. Meth. 345 (2009), 17-28.

The NAb assay of the invention may also be based on (i.e. be an adaptation of, as further described herein) one of the improved ADA assay methods that have been specifically developed for ISV-based biological drugs, such as the assay method that is described in WO 2015/173342 of Ablynx N.V. entitled "Methods, assays and techniques for detecting and/or measuring anti-drug antibodies, in particular treatment-emergent anti-drug antibodies."

It is also known that there are different assays, methods and techniques for performing ADA assays, including (i) ELISA—Bridging Format; (ii) ELISA—Direct Format; (iii) Indirect Format; (iv) Radio Immuno-precipitation Assay (RIP); (v) Surface Plasmon Resonance; and (vi) Electrochemiluminescence-Bridging Format (also referred to in the art as an "ECL-assay" or "ECL-format"). Reference is for example made to Table 1 in the aforementioned review by Mire-Sluis et al., Table 1 in the 2010 review by Wadwha and Thorpe, and Table 2 in the 2006 article by Wadwha and Thorpe.

As mentioned in the 2010 review by Wadwha and Thorpe (see pages 1079-1080 and FIG. 2), one platform that is currently often used in performing ECL assays is the "Meso Scale Discovery" or "MSD platform", available from Meso Scale Diagnostic LLC. This is a bridging assay format that uses ruthenium labels that emit light when electrochemically stimulated for detection.

FIG. 1 schematically shows the principles of ADA bridging assay formats (such as ELISA-bridging format or ECL bridging format) for detecting ADA's (indicated as (1) in FIG. 1) against a conventional antibody (indicated as (2) in FIG. 1). In this format, the sample to be tested for the presence of the ADA's (1) is contacted with the conventional antibody (2) (also referred to as the "capture agent") that is immobilized on a solid support (4) using a suitable covalent or usually non-covalent binder or linker (3) (such as a biotin-steptavidin pair), under conditions that are such that any ADA's (1) in the sample can bind to/are captured by the capturing agent (2).

After any ADA's (1) in the sample have been allowed to bind to the immobilized conventional antibody (2), the non-bound constituents of the sample are washed away using one or more suitable washing steps. The support with the conventional antibody (2) and any ADA's (1) bound to it is then contacted with a "detection agent" (which in the case of the assay shown in FIG. 1 is a second conventional antibody (5) which is either linked directly or via a suitable linker (7) to a detectable label or tag (6) such as, in the case of an ECL assay, a ruthenium label such as SULFO-TAG™ or MSD TAG or another suitable label that can be detected using electrochemiluminescence techniques), under conditions such that the detection agent can bind to the complex of the conventional antibody (2) and the ADA (1).

Usually, in an assay of the format described in FIG. 1, the detection agent used is a suitably tagged or labeled version of the conventional antibody (2), so that the conventional antibodies (2) and (5) in FIG. 1 are the same, with one being immobilized on the support and used as the "capture agent" and the other being suitably tagged or labeled and used as the "detection agent". After the detection agent has been allowed to bind to the complex of the capturing agent (2) and the ADA (1), any excess detection agent is then washed away (i.e. by means of one or more suitable washing steps), after which the presence of detection agent remaining on the solid support (i.e. as part of the complex comprising the capture agent (2), the ADA (1) and the detection agent (3)) is determined or measured using the detectable label or tag (such as, in the case of an ECL assay, by means of electrochemiluminescence). The amount or level of detectable label or tag remaining is then a measure for the amount of ADA's in the sample.

Methodologies and techniques for performing the above ADA assays (such as assay conditions, assay buffers, washing steps, solid supports and linkers for immobilizing the capturing agent and methods for doing the same, suitable tags/labels and methods for linking them to the detection agent, techniques for detecting/measuring the detectable label, and equipment for performing the assays) are known per se (for example from the prior art cited herein or from manufacturer's instructions) or commercially available.

One way of performing bridging assays for measuring ADAs against a drug that comprises an ISV is schematically shown in FIGS. 2A and 2B (using a bivalent ISV construct as an example) and FIG. 3 (using a monovalent ISV as an example). As can be seen from these Figures, the assay according to the invention is based on the general principles of known ADA bridging assays and advantageously can be performed using known methodologies and equipment for performing prior art bridging format ADA assays (again, with the adaptations mentioned herein).

In FIGS. 2A and 2B, by means of non-limiting example, the assay of the invention is illustrated by the use of the assay in detecting ADA's (1) against a bivalent ISV construct (8). As can be seed from FIG. 2B, said bivalent ISV construct used to illustrate the ADA assay in FIG. 2A comprises a first ISV (8a) and a second ISV (8b) that are linked via a suitable linker (8c), in which the first ISV (8a) and the second ISV (8b) can be the same or different (in the latter case, the bivalent ISV construct is bispecific or, in case the ISV's are directed against different epitopes on the same target, biparatopic). However, it should be understood that the assay of the invention can also be used for measuring ADA's against a monovalent ISV (see FIG. 3) or a tri- or multivalent ISV (not shown).

It should also be understood that in the paragraphs below, the assays of the invention are described in the so-called "sequential set-up", in which the steps of contacting the sample containing the anti-drug antibodies with the capturing agent (also referred to herein as "step a)") and contacting the captured anti-drug antibodies with the detection agent (also referred to herein as "step c)") are carried out sequentially (i.e. one after the other) and are usually separated by a washing step (also referred to herein as "step b)"). However, it will be clear to the skilled person that other set-ups or variations of the set-up described herein will also be possible. One such set-up/variation which is important in the practice of the invention is the so-called "homogeneous" set-up in which steps a) and c) are carried out essentially simultaneously, i.e. by adding the sample and the detection agent essentially at the same time (i.e. directly/shortly after one another) to the support with the capturing agent and without the intermediate washing step b), or by first mixing/contacting the sample with the detection agent and then contacting/applying it with/to the support with the capturing agent.

In the assay of the invention (sequential set-up), the bivalent ISV construct (8) is used as the "capture agent" and for this purpose is immobilized on the solid support (4) using a suitable binder or linker (3), such as an avidin-steptavidin binding pair or another suitable non-covalent binding pair (for example, the ISV construct 8 may be biotinylated and form a binding pair with streptavidin that is bound to the solid support (4)). The sample to be tested is then contacted with the immobilized bivalent ISV construct (8) (i.e. under conditions such that any ADA's (1) present in said sample can bind to/are captured by the capturing agent (8)) and any ADA's (1) against the bivalent ISV construct (8) are allowed to bind to the construct/capture agent, after which the non-bound proteins and other constituents of the sample are removed by one or more suitable washing steps (performed in a manner known per se). The solid support (4) with the complex of the capture agent (8) and the ADA's (1) then contacted with the detection agent (9) that is labeled or tagged, either directly or via a suitable linker (7), with a detectable label or tag (again, for the ECL format, a tag or label known per se for performing ECL assays can be used, such as SULFO-TAG™, MSD TAG or another suitable (ruthenium-based) electrochemiluminescence label); under conditions such that the detection agent (9) can bind to the complex of the capturing agent (8) and the ADA (1). The detection agent (9) is then allowed to bind to the complex of the capturing agent (8) and the ADA (1), after which any excess detection agent is then removed (i.e. using one or more suitable washing steps known per se) and the remaining complex formed by the capturing agent (8), the ADA (1) and the detection agent (9) is detected and/or the amount thereof measured) by means of detecting the presence of/measuring the amount of detectable tag or label in a manner known per se (i.e., in the case of an assay in the ECL format, using suitable electrochemiluminescence techniques).

In the assay of the invention, the detection agent (9) will usually be the same (or essentially the same) as the bivalent ISV construct (8), albeit that the detection agent (9) is not linked to the solid support and that the detection agent (9) is tagged or labeled with the detectable tag or label (6), optionally via a suitable linker (7).

Similarly, FIG. 3 schematically shows the use of a bridging assay for measuring ADA's (1) against a monovalent ISV (10). Again, the monovalent ISV (10) is used as the capturing agent and for this purpose is suitably immobilized via linker (3) to support (4). The immobilized monovalent ISV (10) is again contacted with the sample (i.e. under conditions such that allow any ADA's (1) present in said sample to bind to/be captured by the capturing agent (10)) and any ADA's (1) present in the sample are allowed to bind to the capturing agent (10). The other constituents of the sample as removed by means of one or more suitable washing steps.

The ADA's (1) captured by the monovalent ISV (10) are then detected using a detection agent (11), which is the same as the monovalent ISV (10), albeit that the detection agent (11) is not linked to the solid support and that the detection agent (11) is tagged or labeled with the detectable tag or label (6), optionally via a suitable linker (7). Again, for this purpose, the complex of the capturing agent (10) and the ADA (1) is contacted with the detection agent (11) under conditions such that allow the detection agent (11) to bind to the complex of the capturing agent (10) and the ADA (1). In the sequential set-up, the excess detection agent is then removed (i.e. using one or more suitable washing steps known per se), after which the detectable tag/label remaining is detected/measured in a manner known per se. In the homogeneous set-up a mixture of serum components and labeled detector and capture agent is allowed to equilibrate such that complexes of antibodies (or other matrix components) with the labeled agents are formed. The mixture containing pre-formed complexes is added to capturing plates where complexes are bound close to the plates and an ECL read out permits detection of a electroluminescence current rendering multiple washing steps superfluous. Non-captured components of the sample will not render a meaningful detection signal).

The use of the null variants in the improved assay methods of the invention is also schematically illustrated in FIG. 6 (again using a bivalent ISV-based drug as an example).

Advantageously, the assays described herein can be performed using methodologies and techniques known per se for performing ECL-assays (such as assay conditions, assay buffers, washing steps, solid supports and linkers for immobilizing the capturing agent and methods for doing the same, suitable tags/labels and methods for linking them to the detection agent, techniques for detecting/measuring the detectable label, and equipment for performing the assays all known per se for performing ECL assays) or with only minor modifications of such known methodologies or techniques (which can be easily determined and applied by the person skilled in the art of ADA assays, optionally after a limited degree of trial and error). For example and without limitation, as with the known ECL assays described in FIG. 1, the assays of the invention can be performed using the Meso Scale Discovery platform, commercially available from Meso Scale Discovery LLC (see www.mesoscale.com). Other techniques include for example ELISA-based techniques and Delfia® immunoassays (the latter is also well suited for use in a homogeneous set-up as described herein).

Further, after the amount of label (i.e. corresponding to the amount of complex formed) has been measured/detected, (the different components corresponding to) the different signals may be further characterized, and/or the results/read-out obtained may be compared to the results obtained from other assays or measurements performed on the sample(s) (or on other samples, for example obtained from the same subject or group of subjects).

As will be clear to the skilled person, the assay of the invention can also form part of an overall process or determining ADA's (and in particular NAb's) against an ISV-based drug. Such a process can also comprise one or more suitable (pre-) treatment steps, and also one or more data processing steps (which may include comparison to other relevant data). As a non-limiting illustration, FIG. 6 also shows an example of a possible process flow with some non-limiting examples of possible pre-treatment steps (i.e. a target removal step and a BEAD pre-treatment).

In a further aspect, the invention relates to a method for detecting and/or measuring, in a sample, of anti-drug antibodies against an ISV-based drug, said method comprising at least the steps of:
  a) contacting said sample with a capturing agent that is immobilized on a support, wherein said capturing agent is or essentially consists of said ISV-based drug, under conditions such that any anti-drug antibodies against ISV-based drug can bind to said capturing agent;
  b) (optionally) removing any components or constituents present in said sample that do not bind to the capturing agent;
  c) detecting or measuring any anti-drug antibodies that have bound to the capturing agent, by contacting the complex of the capturing agent and any captured anti-drug antibodies with a detection agent, which detection agent is or essentially consists of said ISV-based drug which is linked to a detectable label, under conditions such that said detection agent can bind to (the complex of the capturing agent and) any captured anti-drug antibodies;
wherein at least step a) of said method is performed in the presence of (a sufficient amount of, and preferably an excess of) a null variant of the ISV-based drug (in which said null variant is as further described herein, and in which said method is also performed as further described herein).

As will be clear to the skilled person based on the disclosure herein, the above method is most preferably performed such that, in which in step c), essentially only neutralizing ADAs against the ISV-based drug are detected or measured.

Also, as will again be clear to the skilled person, the above method may in particular be performed on a sample that contains (or is suspected to contain), both neutralizing and non-neutralizing ADAs against the ISV-based drug, which sample has preferably been obtained from a human subject, and may for example be a sample of whole blood, serum, plasma, lymph fluid, ocular fluid, bronchioalveolar fluid/BALF, cerebrospinal fluid or another biological fluid (such as sputum or nasal washes); and in particular a sample of whole blood, serum or plasma.

As further described herein, in the sequential set-up of the methods of the invention, the above steps a) to c) will be carried out sequentially (and will usually include the washing step b); whereas in the homogenous set-up, steps a) and c) will be carried out essentially simultaneously (as described herein) and without the washing step b).

The invention in particular related to a method as described herein in which the sample is a sample of whole blood, serum, plasma, lymph fluid, ocular fluid, bronchioalveolar fluid/BALF, cerebrospinal fluid or another biological fluid (such as sputum or nasal washes); and in particular a sample of whole blood, serum or plasma. Said sample may also be/have been suitably prepared for use in the assay of the invention (for example, by suitable dilution or extraction methods if appropriate).

The invention also relates to a method as further described herein, in which the sample has been obtained from a subject to which said protein, polypeptide or other compound or molecule has been administered and wherein (i) the protein, polypeptide or other compound or molecule has a half-life that is such there is a risk or possibility that anti-drug antibodies against protein, polypeptide or other compound or molecule have been raised in the subject to which said protein, polypeptide or other compound or molecule has been administered (for example, such a protein, polypeptide or other compound or molecule may have a half-life that is as further indicated herein); and/or (i) the protein, polypeptide or other compound or molecule has been administered to a subject according to a regimen that is such that there is a risk or possibility that anti-drug antibodies against protein, polypeptide or other compound or molecule have been raised in the subject to which said protein, polypeptide or other compound or molecule has been administered (for example, wherein the protein, polypeptide or other compound or molecule has been administered repeatedly at relevant intervals, as will be clear to the skilled person/treating physician).

Where said protein, polypeptide or other compound or molecule is a drug or therapeutic, the sample may for example have been obtained from a patient that has been treated with said protein, polypeptide or other compound or molecule. Alternatively, the sample may for example have been obtained from a subject to which said biologic has been administered in the course of a clinical trial.

In another aspect, the invention relates to a method as further described herein, in which the at least one immunoglobulin variable domain that is comprised within the ISV-based drug is a VH domain or has been derived from a VH domain. Again, such immunoglobulin variable domain is preferably an ISV and more in particular an ISV that is a VH domain, a VHH domain or an ISV that has been derived from a VH domain or a VHH domain.

More in particular, the invention relates to a method as further described herein, in which the at least one immunoglobulin variable domain comprised within said ISV-based drug is a nanobody (such as, in particular, a VHH domain, a humanized VHH domain or a camelized VH domain such as a camelized human VH domain), a dAb or a (single) domain antibody; and preferably a nanobody.

The invention further relates to a method as further described herein, in which the ISV-based drug is or essentially consists of a monovalent immunoglobulin single variable domain, The invention further relates to a method as further described herein, in which the ISV-based drug comprises at least one immunoglobulin single variable domains and at least one other therapeutic moiety or entity (either linked directly or via a suitable linker).

The invention further relates to a method as further described herein, in which the ISV-based drug comprises at least two (such as two, three, four or five) immunoglobulin single variable domains (either linked directly or via a suitable linker).

The invention further relates to a method as further described herein, in which the ISV-based drug comprises at least two immunoglobulin single variable domains (either linked directly or via a suitable linker) that are the same.

The invention further relates to a method as further described herein, in which the ISV-based drug comprises or essentially consists of at least two (such as two, three, four or five) immunoglobulin single variable domains (either linked directly or via a suitable linker) that are different.

The invention further relates to a method as further described herein, in which the ISV-based drug comprises or essentially consists of at least two (such as two, three, four or five) immunoglobulin single variable domains (either linked directly or via a suitable linker) that are each directed to a different target (i.e. such that the resulting protein, polypeptide or other compound or molecule is a bi- or multispecific construct).

The invention further relates to a method as further described herein, in which the ISV-based drug comprises or essentially consists of at least two (such as two, three, four or five) immunoglobulin single variable domains (either linked directly or via a suitable linker) that are each directed to a different epitopes on the same target (i.e. such that the resulting protein, polypeptide or other compound or molecule is a bi- or multiparatopic construct).

The invention further relates to a method as further described herein, in which the ISV-based drug comprises or essentially consists of two immunoglobulin single variable domains (either linked directly or via a suitable linker).

The invention further relates to a method as further described herein, in which the ISV-based drug comprises or essentially consists of three immunoglobulin single variable domains (either linked directly or via a suitable linker).

The invention further relates to a method as further described herein, in which the ISV-based drug comprises or essentially consists of four immunoglobulin single variable domains (either linked directly or via a suitable linker).

The invention further relates to a method as further described herein, in which the ISV-based drug further comprises at least one moiety, binding domain or binding unit that confers an increased half-life to said protein, polypeptide or other compound or molecule (i.e. compared to the corresponding protein, polypeptide or other compound or molecule without said moiety, binding domain or binding unit).

The invention further relates to a method as further described herein, in which said at least one moiety, binding domain or binding unit that confers an increased half-life to said protein, polypeptide or other compound or molecule is an immunoglobulin single variable domain.

The invention further relates to a method as further described herein, in which said at least one moiety, binding domain or binding unit that confers an increased half-life to said protein, polypeptide or other compound or molecule is an immunoglobulin single variable domain that is directed against a serum protein, and in particular against a human serum protein.

The invention further relates to a method as further described herein, in which said at least one moiety, binding domain or binding unit that confers an increased half-life to said protein, polypeptide or other compound or molecule is an immunoglobulin single variable domain that is directed against serum albumin, and in particular against human serum albumin.

The invention further relates to a method as further described herein, in which said at least one moiety, binding domain or binding unit that confers an increased half-life to said protein, polypeptide or other compound or molecule is a nanobody, dAb or a (single) domain antibody.

The invention further relates to a method as further described herein, in which said at least one moiety, binding domain or binding unit that confers an increased half-life to said protein, polypeptide or other compound or molecule is a nanobody, and in particular a nanobody that is directed against a serum protein (and in particular a human serum protein) and in particular against serum albumin (and more in particular against human serum albumin).

The invention further relates to a method as further described herein, in which the ISV-based drug comprises or essentially consists of at least two (such as two, three, four or five) immunoglobulin single variable domains (either linked directly or via a suitable linker), at least one of which is directed against a serum protein, and in particular against a human serum protein.

The invention further relates to a method as further described herein, in which the ISV-based drug comprises or essentially consists of at least two (such as two, three, four or five) immunoglobulin single variable domains (either linked directly or via a suitable linker), at least one of which is directed against serum albumin, and in particular against human serum albumin (which may be at the N-terminal end, at the C-terminal end, or if the compound in total (i.e. including the serum albumin-binding ISVD) comprises more than three ISVDs, somewhere in the middle of the compound).

The invention further relates to a method as further described herein, in which the ISV-based drug comprises or essentially consists of either:

- two immunoglobulin single variable domains (either linked directly or via a suitable linker), i.e. (said) one immunoglobulin single variable domain (such as a nanobody) that confers an increased half-life and one other immunoglobulin single variable domain (such as a nanobody) that may in particular be directed against a therapeutic target
- three immunoglobulin single variable domains (either linked directly or via a suitable linker), i.e. (said) one immunoglobulin single variable domain (such as a nanobody) that confers an increased half-life and two other immunoglobulin single variable domains (such as two other nanobodies) that may in particular be directed against a therapeutic target (in which said two other immunoglobulin single variable domains may be directed against the same target, against two different targets or against two different epitopes on the same target); or
- four or five immunoglobulin single variable domains (either linked directly or via a suitable linker), i.e. (said) one immunoglobulin single variable domain (such as a nanobody) that confers an increased half-life and three or four other immunoglobulin single variable domains (such as three of four other nanobodies) that may in particular be directed against a therapeutic target (in which said three or four other immunoglobulin single variable domains may be directed against the same target, against different targets and/or against different epitopes on the same target, or any combination thereof).

The invention further relates to a method as further described herein, in which the detectable tag or label comprised within the detection agent is a tag or label that can be detected using electrochemiluminescence or other suitable techniques (e.g. Delfia®, Luminex®, FRET or other suitable detectable tags/detection techniques for use with Elisa-based ligand-binding assays.

The invention will now be illustrated by means of the following non-limiting examples and Figures, in which:

FIG. 1 schematically shows the principles of bridging assay formats (such as ELISA-bridging format or ECL bridging format) for detecting ADA's against a conventional antibody.

FIGS. 2A and 2B schematically show the use of a bridging assay for detecting ADA's against a bivalent ISV construct.

FIG. 3 schematically show the use of a bridging assay of the invention for detecting ADA's against a monovalent ISV.

FIG. 4 is a table summarizing and exemplifying some different bridging ADA assay formats.

FIG. 5 schematically shows the use of the null variants in the improved assay methods of the invention.

FIG. 6 schematically shows one way in which the improved ADA assay of the invention can form part of an overall process for determining ADA's (and in particular NAb's) against an ISV-based drug. For this purpose, FIG. 6 also shows some non-limiting examples of possible pre-treatment steps (i.e. a target removal step and a BEAD pre-treatment).

FIG. 7 shows the sequences of the Nanobody constructs and corresponding null variants that were used to generate the data shown in the Tables listed in the Experimental Part.

EXPERIMENTAL PART

Figure 1:
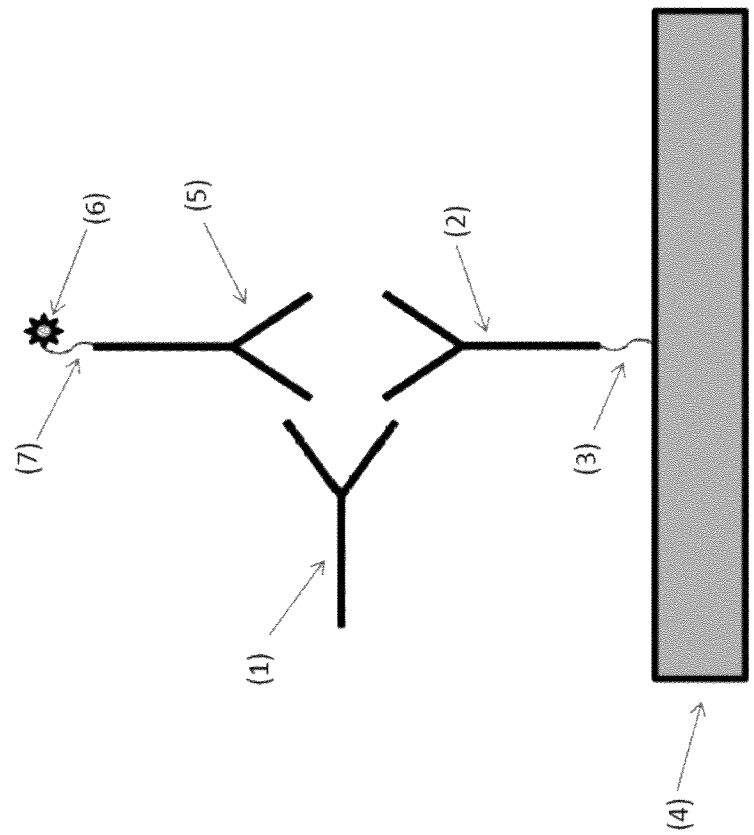
Figures 2A, 2B:
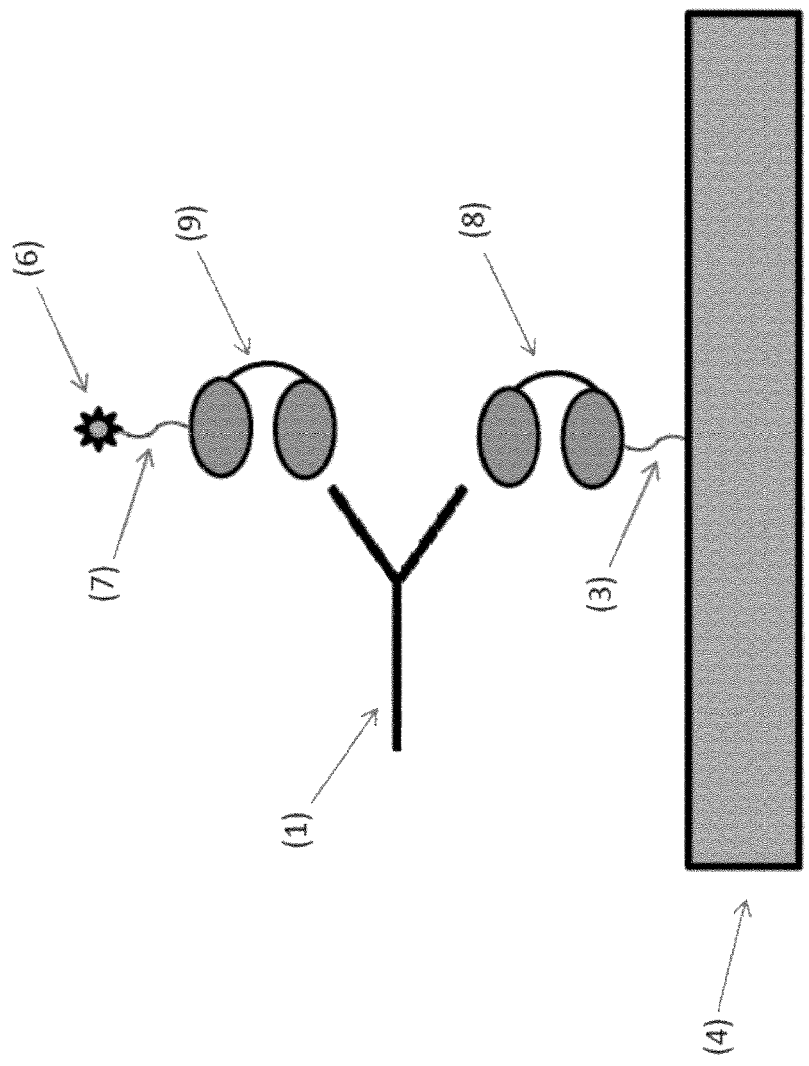
Figure 3:
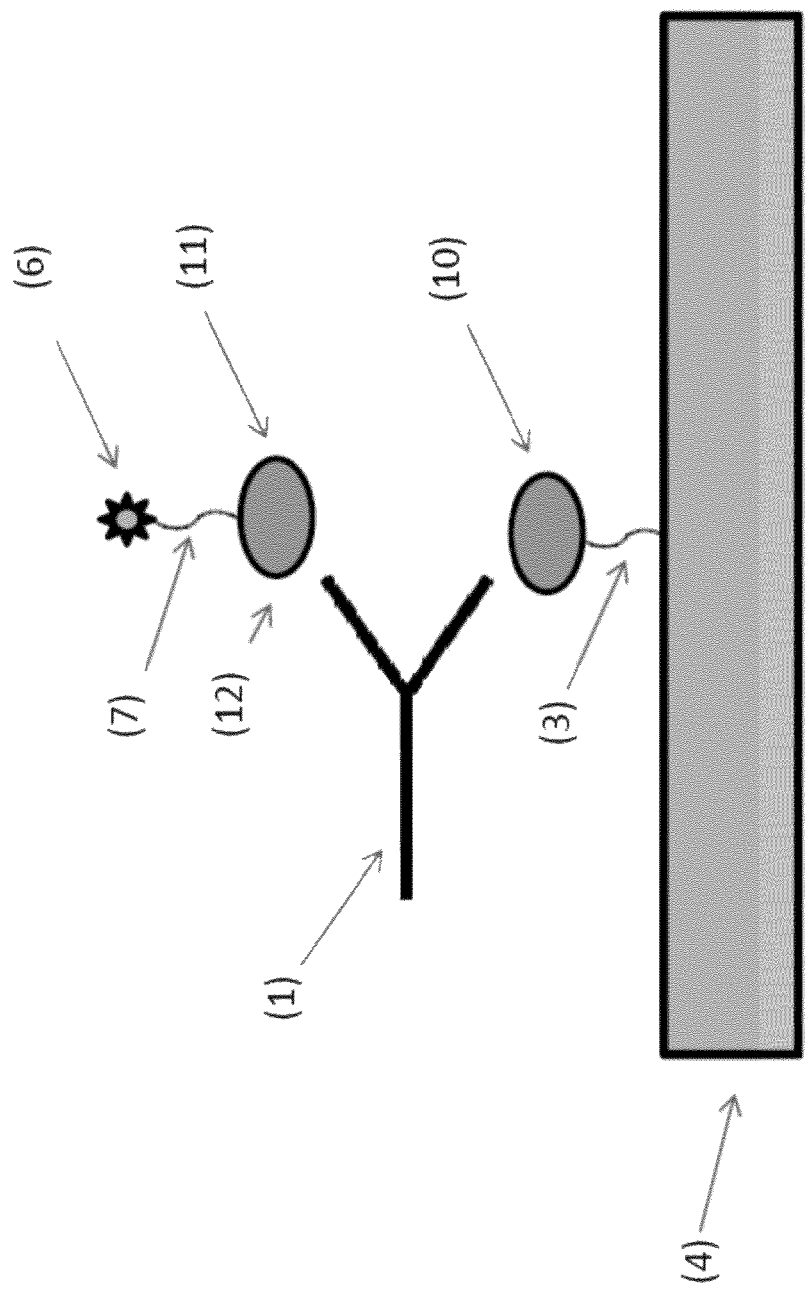

The NAb assay of the invention is based on the conventional bridging ADA assay format. It uses an excess amount of the null variant of the ISV-based drug, i.e. a variant of the ISV-based drug which is non-functional for target binding and which otherwise is essentially identical to the Nanobody. Usually, in the practice of the invention, the null variants will have altered CDR's compared to the original ISV-based drug, which alterations remove the specificity of the ISV-based drug for its therapeutic target (i.e. the specificity of the ISV(s) that, in the ISV-based drug, provide for specific binding to the therapeutic target. This null variant is added to the reagent master mix, in a sufficient amount such that most and preferably all of the non-neutralizing ADAs (in particular, ADAs that bind to the framework sequences of the ISV(s) that are present in the ISV-based drug) bind to the null variant in the master mix rather than to the ISV-based drugs. For example, generally in the practice of the invention, the null variant may be added in an amount and/or concentration that is more than 2×, such as more than 5×, for example more that 10×, and up to 50× or more, the amount and/or concentration, respectively, of the ISV-based drug present in the reaction mix.

When the assay of the invention is performed in this manner, non-neutralizing antibodies are complexed with the null variant of the Nanobody and are left undetected (similar to a drug-displacement set-up as confirmatory assay of the conventional ADA assay), and positive assay signals will reflect ADAs with neutralizing potential only In this respect, it should be noted that ISV-based drug generally differ from most other antibody-based drugs in that ISV-based drug generally are only comprised of antibody variable domains and often will not comprise any antibody constant domains. This makes it even more important to provide assay methods that can distinguish between neutralizing ADAs (which generally will be ADA's binding to or close to the one or more of the CDRs of the ISVs) and non-neutralizing ADAs (which will bind to the framework regions of the ISVs).

For example, there have been several reports in the prior art of (often pre-existing) proteins or factors that may be present in biological samples obtained from human subjects (such as blood samples, serum samples or other biological fluids or samples) and that apparently can bind to the C-terminal region of immunoglobulin variable domains (which is made up by amino acid residues from the framework regions) where such C-terminal region is exposed (i.e. where this C-terminal region is not shielded or covered by another part of the protein or polypeptide of which said immunoglobulin variable domain forms a part. In this respect, it should be noted that in a conventional four-chain antibody, the C-terminal regions of the variable domains are generally shielded by the constant domains to which said variable domains are linked). For example, it is described in WO 12/175741 that the C-terminal region of an VH domain, when exposed (as defined herein and in WO 12/175741), is part of a putative epitope on the VH domain that also includes, among other residues, the amino acid residue at position 14 (and the amino acid residues next/close to the same in the amino acid sequence, such as positions 11, 13 and 15) and may also comprise the amino acid residue at position 83 (and the amino acid residues next/close to the same in the amino acid sequence, such as positions 82, 82a, 82b and 84) and/or the amino acid residue at position 108 (and the amino acid residues next/close to the same in the amino 30 acid sequence, such as positions 107. As in WO 12/17574, this putative epitope is also collectively referred to herein as the "C-terminal region", it being understood that this C-terminal region at least comprises the C terminal sequence VTVSS (i.e. each of positions 109, 110, 111, 112 and 113) and the amino acid residue at position 14, and may also comprise the amino acid residues at positions 83 and 108, and possibly also the amino acid residues at positions 13, 15, 82b, 83, 84 and 107. Reference is again for example made to WO 2015/173342 of Ablynx N.V. With advantage, the assay method of the invention can be used to distinguish NAb's from both "true" (i.e. treatment-emergent) ADA's as well as such "pre-existing" antibodies (i.e. as referred to in WO 2015/173342), and thus can be used to measure NAb's even in samples that also contain treatment-emergent ADAs, pre-existing antibodies, or both.

Example 1

Figure 6:
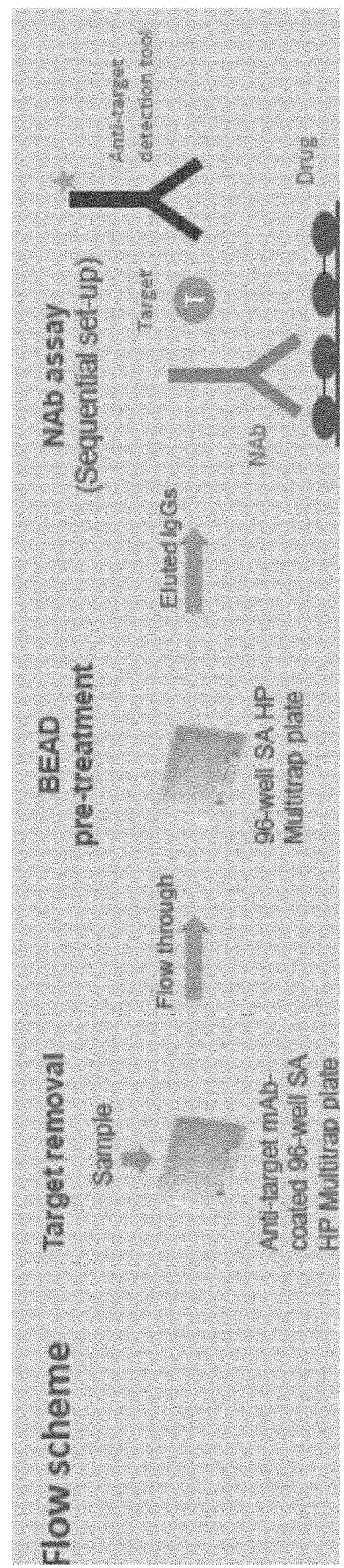

As a first example, a competitive ligand binding assay (CLBA) of the invention was developed using the following requirements (i) drug tolerance: predicted maximum drug levels of 30 µg/mL; (ii) target tolerance: predicted maximum target levels of 1500 ng/mL; and (iii) sensitivity: 250-500 ng/mL positive control antibody in absence of drug (see Table I). The samples were subjected to pretreatment steps essentially as shown in FIG. 6.

The assay format was tested using a panel of established neutralizing and non-neutralizing Ab. The neutralizing potential of the monoclonal antibodies (mAb) was based on their ability to block target interaction as determined in a CLBA (in buffer without pre-treatment). It was found that NAb could be detected at the same sensitivity as compared to the ADA assay (see Table 2). Non-neutralizing Ab were left undetected; some residual binding can be detected at very high Ab concentrations, however these levels are not expected to be clinically relevant.

To further illustration of the validity of the assay methods of the invention, a polyclonal rabbit Ab was specifically generated by immunization. This polyclonal Ab was used as a NAb positive control antibody. Using the assay method of the invention, pre-clinical study samples (rhesus monkey) originating from a disease model known to be prone to development of ADAs (data not shown) were analysed and found to contain neutralizing activity via PD and efficacy markers. The results are shown in Table 3. The neutralizing fraction within the ADA positive samples (Rabbit pAb and pre-clinical study samples) can be determined by titer and/or sensitivity determination.

As can be seen from the data in Table 4, the assay method of the invention generally has similar precision, sensitivity and drug tolerance characteristics as compared to conventional ADA assay methods (e.g. the ADA assay on which the assay of the invention is based). Similar sensitivity and drug tolerance, compliant to current regulatory guidelines (<100 ng/mL positive control in presence of highest anticipated drug levels).

The data in Table 5 shows that target tolerance characteristics was similar as the ADA assay. In case of a monomeric target, this NAb format is target tolerant (intra-run and inter-assay precision: ≤20%).

FIG. 7 shows the sequences of the Nanobody constructs and corresponding null variants that were used to generate the data shown in the above Tables, using an assay protocol essentially similar to the assay protocol described in the following paragraphs.

For example, for measuring NAb's against the ISV-based drug of SEQ ID NO: 3, the corresponding null variant of SEQ ID NO:4 can be used, for example at a concentration which is 100× the concentration of the labeled ISV-drug of SEQ ID NO:3 that is used as the detection agent. The assay can be performed as an electrochemiluminescent (ECL) bridging assay, as follows: a master mix consisting of biotinylated, sulfo-tagged drug (the bivalent Nanobody construct of SEQ ID NO:3) and an excess of null variant molecule (SEQ ID NO:4) is pre-incubated with human serum samples possibly containing antibodies against the ISV-based drug of SEQ ID NO:3. After pre-incubation, the mixture is applied to a MA®96-well Streptavidin Gold plate(s). The biotinylated ISV-based drug in the complex binds to the streptavidin on the plate and detection is performed via the sulfo-tagged ISV-based drug in a Quickplex SQ120 MSD reader after applying a current to the plate(s). The excess null variant in the assay will trap all non-neutralizing antibodies, including so-called pre-existing antibodies, and makes sensitive detection of neutralizing antibodies possible. The further assay conditions can for example be as follows:

Minimum Required Dilution (MRD) of is $\frac{1}{100}$.

Assay diluent buffer: PBS/0.1% casein (prepared from PBS/1% casein from Biorad)

MRD: 100=1% matrix (encompasses a $\frac{1}{33}$ dilution in assay diluent followed by a $\frac{1}{3}$ dilution in master mix)

Master mix: Biotinylated ISV-based drug of SEQ ID NO:3, Sulfo-tagged ISV-based drug of SEQ ID NO:3 (ratio 1/1:2.0 µg/mL [SEQ ID NO:3]-BIO, 2.0 µg/mL [SEQ ID NO:3]—SULFO) and 200 µg/mL of the null variant of SEQ ID NO:4 in PBS/0.1% casein/3.75 mg/mL HSA Read buffer: Read buffer (2×) (diluted in MQ)

TABLE I

| [drug] | NAb assay sensitivity (ng/mL) | ADA assay sensitivity (ng/mL) | Sensitivity difference ADA versus NAb assay |
|---|---|---|---|
| 60 µg/mL | 1890 | <36 | At least 50-fold |
| 30 µg/mL | 1374 | <36 | At least 40-fold |
| 15 µg/mL | 779 | <36 | At least 20-fold |
| 600 ng/ml | 417 | <36 | At least 10-fold |
| 30 ng/ml | 429 | <36 | At least 10-fold |
| 0 | 521 | <36 | At least 10-fold |

TABLE 2

| | | Assay response (ECL) at mAb concentration (ng/mL) | | | | | | | | | Sensitivity in conventional |
|---|---|---|---|---|---|---|---|---|---|---|---|
| | Assay | 20000 | 4000 | 1000 | 500 | 250 | 125 | 63 | 0 | Sensitivity | NAb assay |
| Neutralizing Ab | | | | | | | | | | | |
| mAb 1 | ADA | 19714 | 4122 | 1140 | 599 | 375 | 242 | 178 | 109 | <63 ng/mL | 556 ng/ml |
| | NAb | 23151 | 4633 | 1266 | 640 | 383 | 246 | 173 | 92 | <63 ng/mL | |
| mAb 2 | ADA | 55587 | 10405 | 2786 | 1405 | 754 | 448 | 273 | 106 | <63 ng/mL | 556 ng/ml |
| | NAb | 62575 | 12217 | 3097 | 1596 | 854 | 466 | 278 | 89 | <63 ng/mL | |
| mAb 3 | ADA | 646 | 214 | 139 | 122 | 118 | 117 | 110 | 116 | 400 ng/mL | >5 µg/mL |
| | NAb | 671 | 203 | 127 | 105 | 103 | 99 | 94 | 94 | 543 ng/mL | |
| mAb 4 | ADA | 757 | 250 | 147 | 136 | 125 | 119 | 116 | 107 | 165 ng/mL | >5 µg/mL |
| | NAb | 807 | 251 | 140 | 127 | 117 | 108 | 103 | 95 | 111 ng/mL | |
| Non-neutralizing Ab | | | | | | | | | | | |
| mAb 5 | ADA | 14731 | 5182 | 1811 | 935 | 530 | 301 | 209 | 102 | <63 ng/mL | N/A |
| | NAb | 128 | 101 | 94 | 88 | 88 | 89 | 92 | 96 | 6898 ng/mL | |

TABLE 2-continued

|  | Assay | Assay response (ECL) at mAb concentration (ng/mL) | | | | | | | Sensitivity | Sensitivity in conventional NAb assay |
|---|---|---|---|---|---|---|---|---|---|---|
|  |  | 20000 | 4000 | 1000 | 500 | 250 | 125 | 63 | 0 | | |
| mAb 6 | ADA | 1624 | 435 | 206 | 165 | 139 | 129 | 131 | 120 | <63 ng/mL | N/A |
|  | NAb | 96 | 92 | 95 | 93 | 96 | 97 | 99 | 97 | >20 µg/mL | |
| mAb 7 | ADA | 1197 | 344 | 170 | 141 | 128 | 16 | 120 | 113 | 211 ng/mL | N/A |
|  | NAb | 96 | 89 | 90 | 93 | 94 | 93 | 94 | 95 | >20 µg/mL | |
| mAb 8 | ADA | 106020 | 20679 | 5109 | 2625 | 1314 | 733 | 446 | 110 | <63 ng/mL | N/A |
|  | NAb | 117 | 99 | 92 | 90 | 93 | 94 | 90 | 89 | 11022 ng/mL | |

TABLE 3

|  |  | Assay response (ECL) at pAb concentration (ng/ml) | | | | | | | | Sensitivity | Sensitivity in conventional NAb assay |
|---|---|---|---|---|---|---|---|---|---|---|---|
|  |  | 4000 | 1000 | 500 | 125 | 31 | 13 | 5 | 0 | | |
| Rabbit pAb | ADA | 4694 | 1192 | 65 | 230 | 135 | 117 | 114 | 105 | <5.0 ng/ml | |
|  | NAb | 1520 | 416 | 267 | 129 | 98 | 88 | 95 | 92 | 31 ng/mL | 5 µg/ml |

|  |  | Assay response (ECL) at pAb dilution | | | | | | | |
|---|---|---|---|---|---|---|---|---|---|
| Rhesus Monkey study samples |  | 100 | 400 | 1600 | 6400 | 25600 | 102400 | 409600 | Log 10 (titer) |
| Sample 1 | ADA | 253499 | 25133 | 4526 | 812 | 236 | 121 | 105 | 5.1 |
|  | NAb | 95876 | 15281 | 3032 | 581 | 176 | 106 | 92 | 5.0 |
| Sample 2 | ADA | 714810 | 61990 | 9795 | 1711 | 389 | 155 | 110 | 5.5 |
|  | NAb | 268224 | 41932 | 7437 | 1363 | 309 | 123 | 99 | 5.4 |
| Sample 3 | ADA | 61076 | 9754 | 1496 | 333 | 144 | 112 | 98 | 4.9 |
|  | NAb | 35866 | 6523 | 1197 | 274 | 125 | 96 | 87 | 4.8 |

TABLE 4

|  | ADA - Mean responses (ECL) Concentration drug | | | | | NAb assay (invention) - Mean responses (ECL) Concentration drug | | | | |
|---|---|---|---|---|---|---|---|---|---|---|
| Conc. mAb 2 (ng/ml) | 30.0 µg/mL | 15.0 µg/mL | 0.6 µg/mL | 0.03 µg/mL | No drug | 30.0 µg/mL | 15.0 µg/mL | 0.6 µg/mL | 0.03 µg/mL | No drug |
| 20000.0 | 27386 | 25746 | 41832 | 38100 | 34203 | 32166 | 38126 | 64889 | 67705 | 66243 |
| 5000.0 | 7264 | 9463 | 10162 | 10956 | 12297 | 7329 | 8712 | 13118 | 16188 | 16898 |
| 500.0 | 701 | 881 | 858 | 1210 | 1470 | 858 | 966 | 1164 | 1649 | 1747 |
| 250.0 | 441 | 525 | 512 | 545 | 745 | 456 | 482 | 619 | 817 | 1044 |
| 72.0 | 185 | 220 | 228 | 207 | 316 | 19 | 205 | 250 | 268 | 346 |
| 36.0 | 139 | 148 | 145 | 146 | 180 | 137 | 147 | 160 | 182 | 212 |
| 0.0 | 94 | 99 | 94 | 98 | 103 | 94 | 86 | 96 | 92 | 88 |
| Sensitivity | <36.0 ng/ml | <36.0 ng/ml | <36.0 ng/ml | <36.0 ng/ml | <36.0 ng/ml | <36.0 ng/ml | <36.0 ng/ml. | <36.0 ng/ml | <36.0 ng/ml | <36.0 ng/ml |

TABLE 5

|  |  | ADA | | | Alternative NAb | | |
|---|---|---|---|---|---|---|---|
|  | Conc. mAb 2 (ng/ml) | Overall mean (ECL) | Overall intra-run precision (%) | Inter-batch precision (%) | Overall mean (ECL) | Overall intra-run precision (%) | Inter-batch precision (%) |
| HiQC | 20000.0 | 46942 | 4.8 | 15.8 | 64390 | 8.5 | 19.2 |
| LoQC2 | 72.0 | 245 | 3.4 | 9.5 | 306 | 5.6 | 14.9 |
| LoQC1 | 36.0 | 168 | 3.0 | 6.8 | 196 | 4.9 | 10.6 |
| BLK | 0.0 | 97 | 3.8 | N/A | 85 | 4.2 | N/A |

Overall Overall intra- Inter-batch Overall Overall intra- Inter-batch

Example 2

In this example, a bridging ADA assay (ECL format) of the invention was developed for a bivalent bispecific Nanobody construct (the "Nanobody drug") comprising an N-terminal Nanobody against a human therapeutic target (the "anti-target Nb") and a C-terminal Nanobody against serum albumin (the "anti-HSA Nb"), linked via a 35GS linker. The C-terminal anti-HSA Nb carried a C-terminal extension (a single alanine residue).

detectable signal on the plate, which will then represent only the amount of neutralizing antibodies (2) in the sample (and not any the non-neutralizing antibodies (6) that may also have been present in the sample). In this way, the assay of the invention allows the amount of "neutralizing" ADAs (2) in a sample to be measured, even when the sample also contains for example non-neutralizing ADAs and/or pre-existing antibodies.

The assay conditions used are listed in Table 6.

TABLE 6

ECL assay set-up.

A master mix containing biotinylated and sulfotagged bispecific Nanobody drug (1) is pre-incubated with Protein G pre-treated Cynomolgus monkey serum samples possibly containing antibodies (2) against the drug. The protein G pre-treatment step was introduced to increase drug tolerance characteristics. After pre-incubation, the mixture is applied to a MA®96-well Streptavidin Gold plate (4). The biotinylated Nanobody drug in the complex binds to the streptavidin on the plate and detection is performed via the sulfo-tagged Nanobody drug in a Sector Imager 2400 after applying a current to the plate(s).

Summary assay conditions:

Protein G pre-treatment step using protein G HP Multitrap plates (Supplied by GE Healthcare Life Sciences; catalogue number 28-9031-35)
Assay diluent: PBS/0.1% casein
MRD 1/50 = 2.0% matrix (includes 1/5 dilution during Protein G pre-treatment step, 1/4 dilution after Protein G pre-treatment step followed by 1/2.5 dilution in the MM)
MM: 1.0 µg/ml Nanobody drug-Bio, 1.0 µg/ml Nanobody drug-Sulfo in 1:1 ratio supplemented with 3.0 mg/mL HSA
Read buffer: read buffer (2x)

Assay in the presence of the null variant (invention)

The assay was performed under the above conditions, but in the presence of 100 µg/ml of the null variant described in this Example 2.

Assay in the presence of excess of Nanobody drug (reference)

The assay was performed under the above conditions, but in the presence of 100 µg/ml of the Nanobody drug used in this Example 2.

Figure 5:
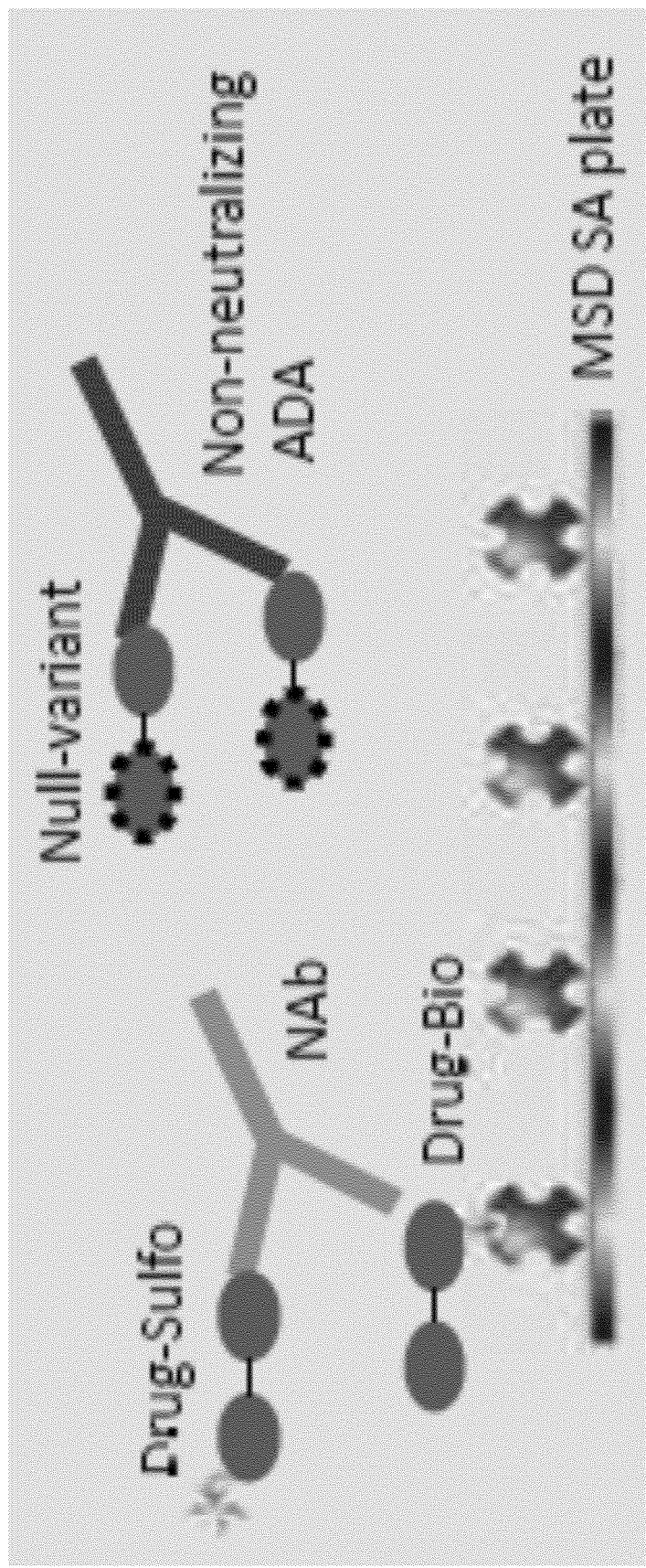
Figure 8A:
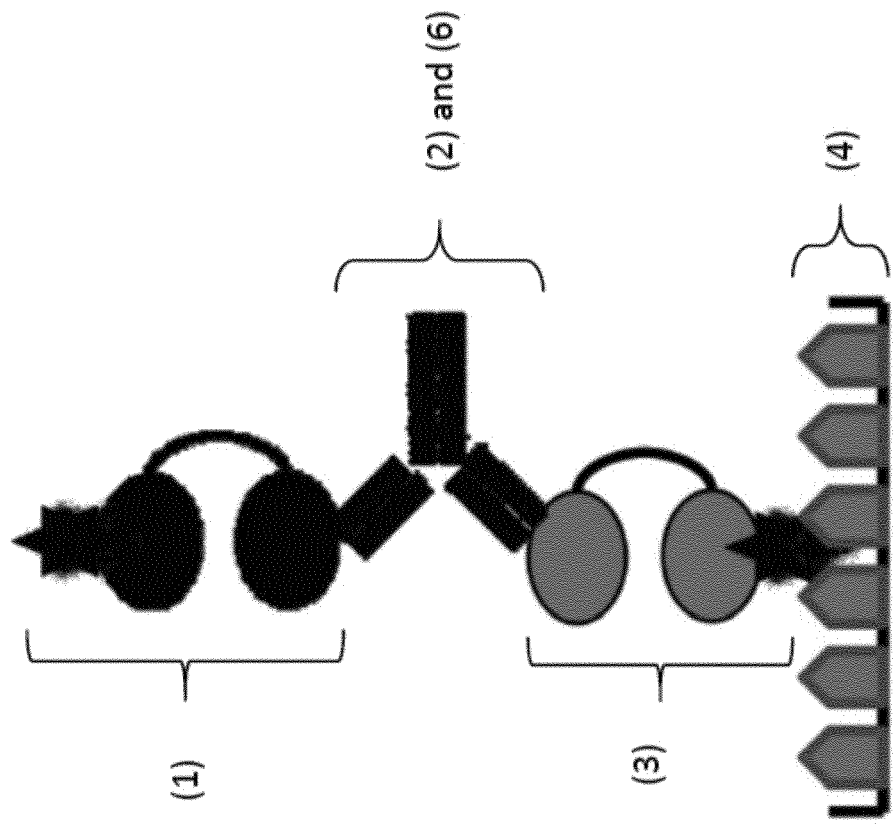
FIG. 8A is a schematic representation of the ECL-based bridging ADA assay used in Example 2.
Figure 8B:
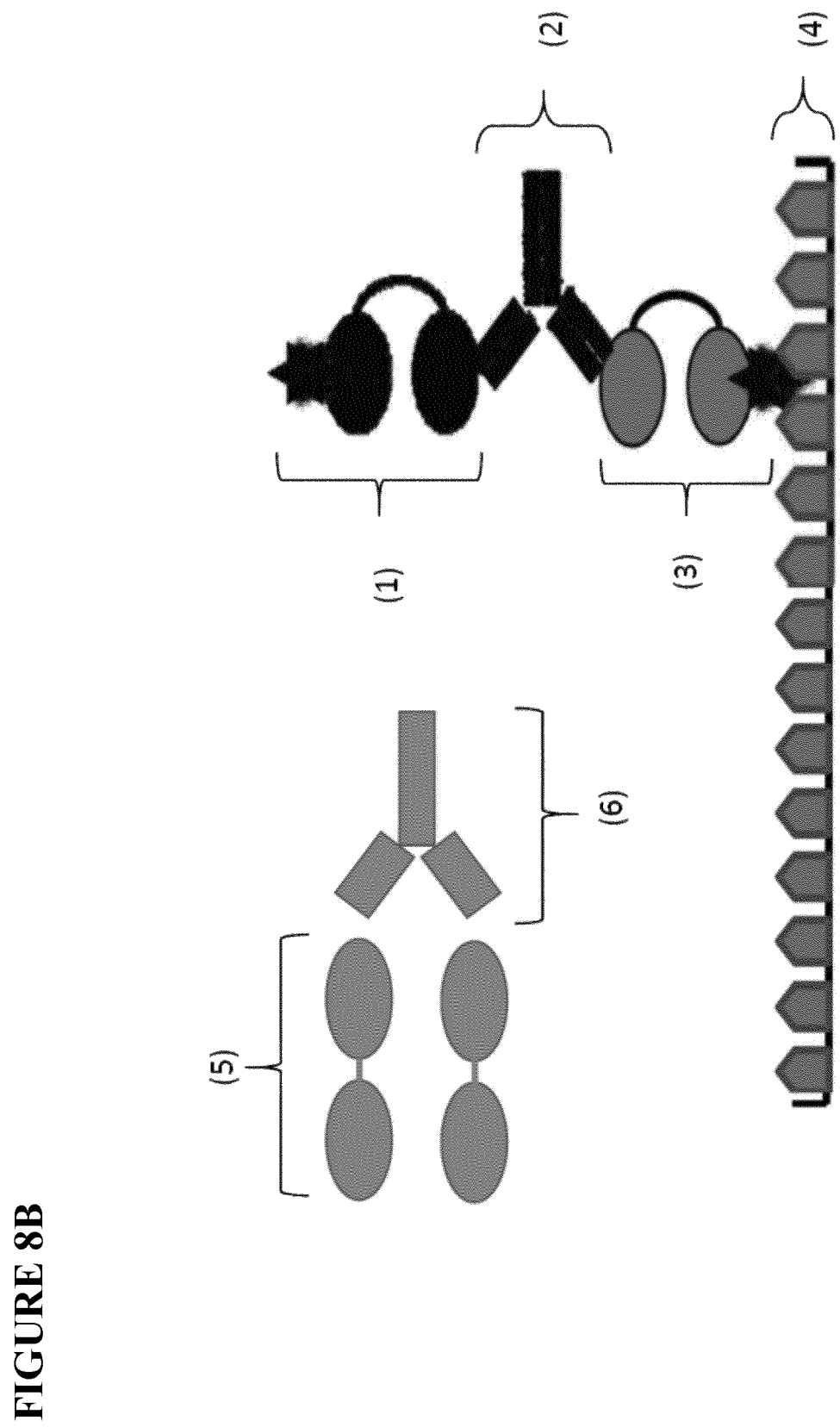
FIG. 8B is a schematic representation of the same ECL-based bridging ADA assay shown in FIG. 8A, but performed in the presence of the null variant (as further described in Example 2).

The general set-up of the assay is schematically shown in FIGS. 8A and 8B (prior art and invention, respectively), and essentially works in the same way as the assay that is schematically shown in FIG. 5.

FIG. 8A schematically shows the set-up for a conventional ECL bridging assay, in which (1) is a sulfo-tagged Nanobody drug, (3) is a biotinylated Nanobody drug and (4) is a streptavidin-coated plate. Any antibodies (2) or (6) against the Nanobody drug that are present in the sample to be tested will form a "bridge" between the biotinylated Nanobody Drug captured on the streptavidin plate and the sulfo-tagged Nanobody Drug that carries the detectable label, leading to a detectable signal on the plate that represents the amount of monoclonal antibodies (2) or (6) that are in the sample.

In this conventional ECL set-up, the bridging assay cannot distinguish between neutralizing antibodies (2) and non-neutralizing antibodies (6).

FIG. 8B schematically shows the set-up for a ECL bridging assay according to the invention, which is performed in the presence of a null variant (5) of the Nanobody drug. In this set-up, the non-neutralizing antibodies (6) (which may for example be non-neutralizing ADA's or pre-existing antibodies) will bind to the null-variant that is present in the assay mixture (i.e. in excess amount) and will be removed during the washing step(s). Only "neutralizing" antibodies (2) (i.e. antibodies which may have neutralizing capacity, for example because they can bind to the CDRs of the Nanobody drug) will bridge the sulfo-tagged Nanobody drug (1) with the biotinylated Nanobody drug (3) and lead to a To establish an assay of the invention, a null variant was made that had the same amino acid sequence as the Nanobody drug, except that, compared to the Nanobody drug, the null variant contained a combination of the following differences (i) to (iv) in the sequence of the anti-target Nb: (i) a single amino acid substitution in framework 1; (ii) 5 separate amino acid substitutions in CDR2; (iii) 3 separate amino acid substitutions in framework 3; and (iv) replacement of CDR3 by a different CDR3 (frameworks and CDRs defined according to Kabat). The 35GSlinker, the C-terminal extension and anti-HSA Nb in the null variant each had the same amino acid sequence as those present in the therapeutic construct.

Due to these changes in the frameworks and CDRs of the anti-target Nb, the null variant was not capable of specific binding to the therapeutic target of Nanobody drug (this was confirmed experimentally).

It was also confirmed that mAbs that are neutralizing for the Nanobody drug were not capable of binding to the null variant. For this purpose, two mAbs were used that had previously been identified as being neutralizing for the anti-target Nb that is present in the Nanobody drug. It was shown that these neutralizing mAbs were not bound by the null variant in direct ELISA. It was then investigated whether these neutralizing mAbs still gave a signal in the ECL bridging assay, even when performed in the presence of the null variant, and indeed these neutralizing mAbs resulted in a residual ECL signal compared, showing that these neutralizing mAbs were not captured by the null variant but instead gave rise to a detectable signal in the ECL assay.

The assay of the invention was then used to analyse 10 serum samples of healthy Cynomolgus monkeys. These samples were known to contain pre-existing antibodies, which are known to bind to the C-terminal end of a Nanobody construct (but not to its CDR's). The results are shown in Table 8.

The results show that, even in samples with high medium to high levels of pre-existing antibodies (4, 5, 6, 7, 9 and 10), performing the assay in the presence of the null variant did not give rise to ECL signals that are caused by the pre-existing antibodies (the ECL values in the presence of the null variant were comparable to those obtained in the presence of an excess of the Nanobody drug, which captures all anti-drug antibodies in the samples).

The assay was then used to monitor the ADA response during a 13 week subchronic toxicity study in which the Nanobody drug was administered subcutaneously to cynomolgus monkeys. The Nanobody drug was administered to 3 dose groups (at 15, 50 and 150 mg/kg body weight) of 5 animals/group (A to E) and samples were taken and analysed on days 1, 15, 29, 57 and 92. The results for the three dose groups are shown in Table 9, in which: "#" indicates the animal (A, B, C, D, E) in each dose group; "Day" refers to the day the sample was taken; "ECL" is the ECL value measured when the ECL assay was performed without added null variant (reference); "Inv" refers to the ECL value measured when the ECL assay was performed with added null variant (invention); and "Ref" refers to the ECL value measured when the ECL assay was performed with added Nanobody Drug (reference A).

As can be seen, in some cases (for example animal B in the 15 mg/kg dose group), strong signals in the ECL on Day 1 (indicating that the antibodies measured in the ECL assay are most-likely non-neutralizing pre-existing antibodies against the Nanobody drug and not neutralizing antibodies against the CDRs) did not lead to an ECL signal in the assay of the invention, which confirms that the assay of the invention is capable of distinguishing between pre-existing antibodies and treatment-emergent neutralizing ADAs.

In other cases (for example animals A and D in the 15 mg/kg dose group), the ECL essentially did not give a signal above reference on Day 1 (indicating essentially no pre-existing antibodies) but the ECL signal increased during treatment, indicating that ADA's emerged during treatment. However, the absence of a corresponding increase in the ECL signal when the assay was performed in the presence of the null variant indicates that these treatment-emergent ADAs are non-neutralizing and/or not directed against the CDRs of the Nanobody drug.

In yet other cases (for example animals A and D in the 50 mg/kg dose group), an increase in the ECL during treatment coincided with an increase in the ECL signal when the assay was performed in the presence of the null variant. This indicates that some of the treatment-emergent ADA's that are measured with the ECL are likely also neutralizing and/or directed against the CDRs of the Nanobody drug.

TABLE 8 use of the assay on samples known to contain pre-existing antibodies.

| | Mean ECL values | | |
|---|---|---|---|
| Sample | No null variant (reference) | With excess Nanobody drug (reference A) | With null variant (invention) |
| 1 | 60.5 | 54.5 | 60.0 |
| 2 | 92.0 | 60.0 | 59.0 |
| 3 | 57.5 | 58.5 | 54.0 |
| 4 | 470.5 | 58.0 | 54.5 |
| 5 | 1699.0 | 57.0 | 51.5 |
| 6 | 407.0 | 57.5 | 60.0 |
| 7 | 449.5 | 55.5 | 56.0 |
| 8 | 105.5 | 56.5 | 54.0 |
| 9 | 352.0 | 56.5 | 57.5 |
| 10 | 326.0 | 56.5 | 56.0 |

TABLE 9

ADA assay: results from 13 week toxicity study

| Dose group: 15 mg/kg | | | | Dose group: 50 mg/kg | | | | Dose group: 150 mg/kg | | | |
|---|---|---|---|---|---|---|---|---|---|---|---|
| # | Day | ECL | Ref | Inv | # | Day | FCL | Ref | Inv | # | Day | ECL | Ref | Inv |
| A | 1 | 57.0 | 53.5 | 58.0 | A | 1 | 62.0 | 54.0 | 53.5 | A | 1 | 67.5 | 65.5 | 67.0 |
| A | 19 | 71.5 | 60.0 | 69.0 | A | 15 | 75.5 | 67.0 | 64.5 | A | 15 | 253.0 | 89.5 | 157.0 |
| A | 29 | 83.5 | 58.0 | 73.0 | A | 29 | 121.5 | 61.0 | 92.0 | A | 29 | 688.0 | 85.0 | 475.0 |
| A | 57 | 229.0 | 55.5 | 64.0 | A | 57 | 1157.5 | 69.5 | 124.5 | A | 57 | 4234.5 | 102.0 | 1297.0 |
| A | 92 | 742.0 | 54.0 | 58.5 | A | 92 | 2166.0 | 68.0 | 207.5 | A | 92 | 1957.5 | 77.5 | 795.0 |
| B | 1 | 1110.0 | 62.5 | 58.5 | B | 1 | 54.0 | 55.5 | 49.5 | B | 1 | 104.5 | 65.5 | 67.0 |
| B | 15 | 1219.5 | 60.5 | 55.5 | B | 15 | 62.5 | 53.0 | 61.5 | B | 15 | 138.5 | 75.0 | 91.5 |
| B | 29 | 1270.0 | 57.5 | 54.0 | B | 29 | 856.5 | 68.0 | 358.0 | B | 29 | 347.0 | 97.0 | 183.5 |
| B | 57 | 1317.5 | 60.5 | 52.5 | B | 57 | 4507.0 | 83.5 | 1260.5 | B | 57 | 2538.0 | 83.0 | 182.5 |
| B | 92 | 1286.5 | 57.0 | 57.5 | B | 92 | 3698.0 | 78.5 | 1292.0 | B | 92 | 1674.0 | 86.5 | 176.5 |
| C | 1 | 65.0 | 55.5 | 60.0 | C | 1 | 76.0 | 60.0 | 59.0 | C | 1 | 66.0 | 60.5 | 60.5 |
| C | 15 | 57.5 | 57.5 | 54.5 | C | 15 | 74.0 | 55.5 | 59.0 | C | 15 | 253.0 | 90.5 | 118.5 |
| C | 29 | 62.5 | 56.0 | 57.5 | C | 29 | 72.5 | 56.5 | 56.5 | C | 25 | 2093.5 | 81.5 | 312.0 |
| C | 57 | 1038.5 | 58.0 | 77.0 | C | 57 | 372.5 | 54.5 | 62.5 | C | 57 | 4976.5 | 102.0 | 1265.0 |
| C | 93 | 1296.0 | 58.0 | 158.0 | C | 92 | 1146.5 | 57.0 | 56.5 | C | 92 | 4724.0 | 101.5 | 1230.0 |
| D | 1 | 57.0 | 55.5 | 60.0 | D | 1 | 60.0 | 60.5 | 57.5 | D | 1 | 72.5 | 65.5 | 69.0 |
| D | 19 | 57.0 | 59.0 | 56.5 | D | 15 | 66.0 | 59.5 | 57.0 | D | 15 | 80.0 | 68.0 | 74.5 |
| D | 29 | 55.5 | 59.0 | 56.5 | D | 29 | 1530.0 | 65.0 | 131.5 | D | 29 | 83.0 | 68.5 | 84.5 |
| D | 57 | 143.5 | 55.5 | 57.0 | D | 57 | 4718.0 | 76.5 | 495.0 | D | 57 | 115.5 | 68.0 | 86.0 |
| D | 92 | 1722.5 | 55.5 | 69.5 | D | 92 | 3713.5 | 70.0 | 677.0 | D | 92 | 401.0 | 66.5 | 94.5 |
| D | 1 | 69.5 | 56.5 | 52.5 | E | 1 | 65.0 | 62.5 | 63.0 | E | 1 | 70.5 | 61.0 | 60.0 |

TABLE 9-continued

ADA assay: results from 13 week toxicity study

| Dose group: 15 mg/kg | | | | | Dose group: 50 mg/kg | | | | | Dose group: 150 mg/kg | | | |
| --- | --- | --- | --- | --- | --- | --- | --- | --- | --- | --- | --- | --- | --- |
| # | Day | ECL | Ref | Inv | # | Day | FCL | Ref | Inv | # | Day | ECL | Ref | Inv |
| E | 15 | 63.5 | 56.5 | 57.0 | E | 15 | 82.0 | 64.0 | 69.0 | E | 15 | 110.0 | 60.0 | 64.0 |
| E | 29 | 66.0 | 58.0 | 67.0 | E | 29 | 124.5 | 63.5 | 73.5 | E | 29 | 403.0 | 71.5 | 298.0 |
| E | 57 | 140.0 | 64.0 | 101.5 | E | 57 | N/A | N/A | N/A | E | 57 | 1263.0 | 92.0 | 932.0 |
| E | 92 | 556.9 | 67.5 | 179.5 | E | 92 | 1910.0 | 69.0 | 80.5 | E | 92 | 2391.5 | 95.0 | 1333.5 |

---

The invention claimed is:

1. A method comprising:
   a) selecting an immunoglobulin single variable domain (ISV)-based drug, wherein the ISV-based drug comprises a polypeptide having an amino acid sequence of one or more ISV(s), each ISV comprising four framework regions (FW1, FW2, FW3, and FW4) and three complementarity determining regions (CDR1, CDR2 and CDR3);
   b) producing an ISV-based drug variant that comprises a structure that is essentially identical to the ISV-based drug, wherein the ISV-based drug variant has, relative to the ISV-based drug, one or more amino acid changes in a CDR(s);
   c) contacting a sample with the ISV-based drug variant and a first agent, wherein said first agent is immobilized on a support and comprises said ISV-based drug, and wherein said contacting occurs under conditions such that any neutralizing ADAs against the ISV-based drug can bind to the ISV-based drug of the first agent;
   d) washing the first agent to remove components or constituents present in said sample that are not bound to the first agent; and
   e) contacting the first agent and any neutralizing ADAs bound to the ISV-based drug of the first agent with a second agent, wherein the second agent comprises said ISV-based drug linked to a detectable label, wherein said contacting occurs under conditions such that the ISV-based drug of said second agent can be bound by any neutralizing ADA against the ISV-based drug that are bound to the ISV-based drug of the first agent.

2. The method according to claim 1, in which the ISV-based drug variant has a degree of sequence identity with the ISV-based drug of at least 95%, not taking into account the changes in the CDR(s).

3. The method according to claim 1, which is performed on a sample that contains or is suspected to contain, both neutralizing and non-neutralizing ADAs against the ISV-based drug.

4. The method according to claim 1, which is performed on a sample obtained from a human subject.

5. The method of claim 1, wherein the ISV-based drug variant has, without considering the amino acid changes in the CDR(s), a degree of sequence identity with the ISV-based drug of at least 90%.

6. The method according to claim 1, which is performed on a sample of whole blood, serum, plasma, lymph fluid, ocular fluid, bronchoalveolar fluid/BALF, cerebrospinal fluid or another biological fluid.

7. The method according to claim 6, wherein the biological fluid is sputum or nasal washes.

8. The method according to claim 6, wherein the biological fluid is a sample of whole blood, serum or plasma.

9. The method according to claim 1, in which the ISV-based drug comprises at least two ISVs.

10. The method according to claim 9, in which the ISV-based drug comprises at least one ISV against serum albumin.

11. The method according to claim 9, in which the ISV-based drug comprises 2, 3, 4 or 5 ISVs.

12. The method of claim 9, in which the ISV-based drug comprises two or more ISVs having identical CDRs.

13. The method of claim 9, in which the ISV-based drug comprises two or more ISVs having amino acid differences in one or more CDR(s).

14. The method of claim 13, in which the ISV-based drug variant does not comprise any ISV having identical CDRs to an ISV of the ISV-based drug.

* * * * *